(12) United States Patent
Harvey

(10) Patent No.: US 11,348,007 B2
(45) Date of Patent: *May 31, 2022

(54) DEVICES AND METHODS USING MACHINE LEARNING FOR SURVEILLANCE AND GRANTING OF PRIVILEGES

(71) Applicant: Thomas Danaher Harvey, Rockville, MD (US)

(72) Inventor: Thomas Danaher Harvey, Rockville, MD (US)

(*) Notice: Subject to any disclaimer, the term of this patent is extended or adjusted under 35 U.S.C. 154(b) by 256 days.

This patent is subject to a terminal disclaimer.

(21) Appl. No.: 16/865,396

(22) Filed: May 3, 2020

(65) Prior Publication Data

US 2020/0265311 A1     Aug. 20, 2020

Related U.S. Application Data

(63) Continuation of application No. 16/390,049, filed on Apr. 22, 2019, now Pat. No. 10,657,444, which is a continuation-in-part of application No. 15/885,684, filed on Jan. 31, 2018, now Pat. No. 10,282,668, which is a continuation-in-part of application No. 15/453,996, filed on Mar. 9, 2017, now Pat. No. 9,921,068.

(60) Provisional application No. 62/690,367, filed on Jun. 27, 2018.

(51) Int. Cl.
*G06N 3/08*     (2006.01)
*G06N 20/20*   (2019.01)
*G06K 9/62*     (2022.01)

(52) U.S. Cl.
CPC .............. *G06N 3/08* (2013.01); *G06K 9/6256* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 2011/0007950 A1* | 1/2011 | Deutsch | A61B 90/92 382/111 |
| 2018/0039848 A1* | 2/2018 | Konolige | B25J 9/1692 |
| 2018/0075565 A1* | 3/2018 | Myers | G05D 1/0088 |

FOREIGN PATENT DOCUMENTS

WO    WO-2013178819 A1 * 12/2013 ......... G06K 9/00362

* cited by examiner

*Primary Examiner* — Abdhesh K Jha

(57) ABSTRACT

A method and system where a first subsystem makes observations and performs surveillance using sensors in a mode that conserves a resource such as power, data transmission band width or processing cycles. This is accomplished by reducing illumination, pixel count, sampling rate or other functions that result in a limited granularity or data collection rate. A machine model is applied to the limited data and, when it evaluates to a suitable result or a prediction of an interesting condition, another subsystem or the same subsystem in a different mode collects data at a finer granularity with a higher data collection size or rate and evaluates that data to determine the nature of the first evaluation. The machine model may be trained in stages on a large scale server and on a small field processor. Data from the sensor may be used for training to improve the second step.

8 Claims, 22 Drawing Sheets

DEVICES AND METHODS USING MACHINE LEARNING FOR SURVEILLANCE AND GRANTING OF PRIVILEGES

CROSS REFERENCE TO RELATED APPLICATIONS

This application is a continuation and claims priority to U.S. patent application Ser. No. 16/390,049 filed Apr. 22, 2019 which claims priority to U.S. provisional patent application 62/690,367 filed Jun. 27, 2018. U.S. patent application Ser. No. 16/390,049 is a continuation-in-part of U.S. patent application Ser. No. 15/885,684 filed Jan. 31, 2018, now U.S. Pat. No. 10,282,668 issued May 7, 2019. U.S. patent application Ser. No. 15/885,684 is a continuation-in-part of U.S. patent application Ser. No. 15/453,996 filed Mar. 9, 2017, now U.S. Pat. No. 9,921,068.

Each patent application identified above is incorporated here by reference in its entirety to provide continuity of disclosure. Where a definition or use of a term in a reference, which is incorporated by reference herein, is inconsistent or contrary to the definition of that term provided herein, the definition of that term provided herein applies and the definition of that term in the reference does not apply.

Furthermore, where a definition or use of a term in a reference, which is included in material in a section marked as material from the parent application, is inconsistent or contrary to the definition or use of the term in a corresponding section marked as material for the current application, the definition of the term for the current application applies and the definition of that term in the parent application does not apply.

STATEMENT REGARDING FEDERALLY SPONSORED RESEARCH OR DEVELOPMENT

Not Applicable

BACKGROUND OF THE INVENTION

Field of the Current Invention

The present invention is in the field of surveillance monitoring.

Background Concerning the Need for the Current Invention

Whatever the nature of the sensors used for surveillance purposes, there can be a need for continuous vigilance. Using the full power of cameras, microphones and other detectors can use substantial resources which may not be available continuously. Used in a more limited mode that conserves the resources they may be sufficient to detect situations where a temporary increase in resource usage is required. In this limited recognition of the situation needs to be automated.

BRIEF SUMMARY OF THE INVENTION

Brief Summary of the Grandparent Invention

The parent invention envisions devices and method using the devices to escape from a venue when a threat is detected. A processor constructs a model of a venue in its memory based on first information which is available prior to entry of a person to be protected from potential hazards. The model is trained by machine learning methods and receives further training after the person enters the venue. The model, thereby, takes into account the location of the person and information gathered by sensors about conditions on entry. Other pre-training can concern methods of escape from typical venues and behaviors by persons in the presence of hazards.

Observed conditions are evaluated by a processor in accordance with the model and the device generates an escape plan when a hazard is detected. The escape plan is displayed or transmitted to the protected person to facilitate escape from the threatened venue. The protected person thereby has an improved chance of successful escape in spite of difficulties that may appear from the threat or the conditions of escape. Warnings of a hazard may be detected and transmitted separately from the plan of escape.

Brief Summary of the Parent Invention

The current invention claimed in this application concerns devices and methods to determine whether or not physical elements present in a situation are compliant with a set of rules by using a machine learning system to test compliance from data gathered by one or more sensors. The machine learning system is trained on one processor with data concerning objects and behaviors indicating compliance with the rules. The resulting trained model is downloaded to another processor for field use in determining compliance in specific cases. There is further training of the model with specific information concerning the context of the case to be examined and then data from the sensor is used to determine compliance.

The inputs to the model for the determination come at least from the sensor and perhaps from servers or other sources as well. The output of the evaluation of the model is used to transmit the determination or to control granting of a privilege that is intended to be conditional on compliance with the rules. The additional inputs may be selected on the basis of a previous or partial evaluation of the model or on the basis of data from the sensor. In some cases, more than two processors may be used. For, example one processor may do the pre-training, one the training concerning specific circumstances for the case to be tested, and a third to do the evaluation.

Brief Summary of the Current Invention

The current invention is a system or method to allow observations in greater detail or granularity when conditions indicate the desirability of having this detail, but observing at other times with reduced resource usage. The steps to implement this are (1) train model with sensors to identify conditions which may have a need for observation with fine granularity, (2) observe at a coarse granularity saving resources, (3) process observations with the trained model which allows determination that there is an increase in probability of an interesting target, (4) if model applied to inputs from observation at coarse granularity produces appropriate output put the observation device in a fine granularity mode (5) observe at fine granularity.

BRIEF DESCRIPTION OF THE SEVERAL VIEWS OF THE DRAWING

The features and advantages of the various embodiments disclosed herein will be better understood with respect to the drawing in which:

Figures from the Parent Application

FIG. 10 through 17 are new to the parent Application.

FIG. 1 is plan diagram of a protected person entering a venue with an escape device.

FIG. 2 is plan diagram of a protected person leaving a venue with the guidance of an escape device after a hazard is detected.

FIG. 3 shows a front view of a typical embodiment of an escape guiding device

FIG. 4 shows a back view of the device of FIG. 3.

FIG. 5 shows a venue on board an aircraft.

FIG. 6 shows an escape device as part of the equipment of various persons.

FIG. 7 shows an embodiment of an escape device in a smart phone.

FIG. 8 shows an embodiment of an escape device in a vehicle.

FIG. 9 shows the steps and structure of the basic information flow of the device and its training.

FIG. 10 shows a diagram for process of developing software for an escape device.

FIG. 11 shows a diagram of the operation of a system to determine compliance.

FIG. 12 shows the training and operation of a machine learning model for determining compliance.

FIG. 13 shows an embodiment for judging compliance of a lacrosse stick with related game rules.

FIG. 14 shows a traffic stop where compliance with a "drunk driving" rule is being enforced.

FIG. 15 shows an office using a device to scan a suspected drive in the stop of FIG. 14.

FIG. 16 shows two suspected persons being tested in the traffic stop.

FIG. 17 is a diagram showing the training procedure for one level of a training process of a machine model.

New Figures for the Current Application

Figure 18:
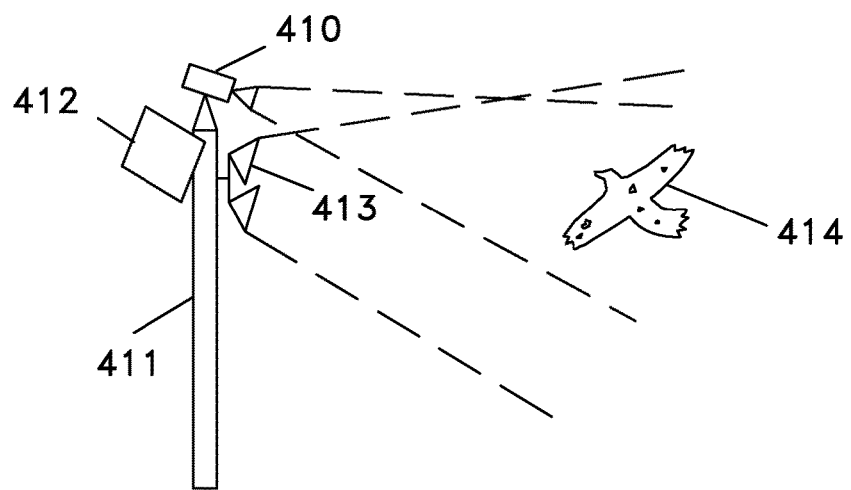

FIG. 18 is a view of an embodiment using a camera with controlled illumination in a remote area.

Figure 19:
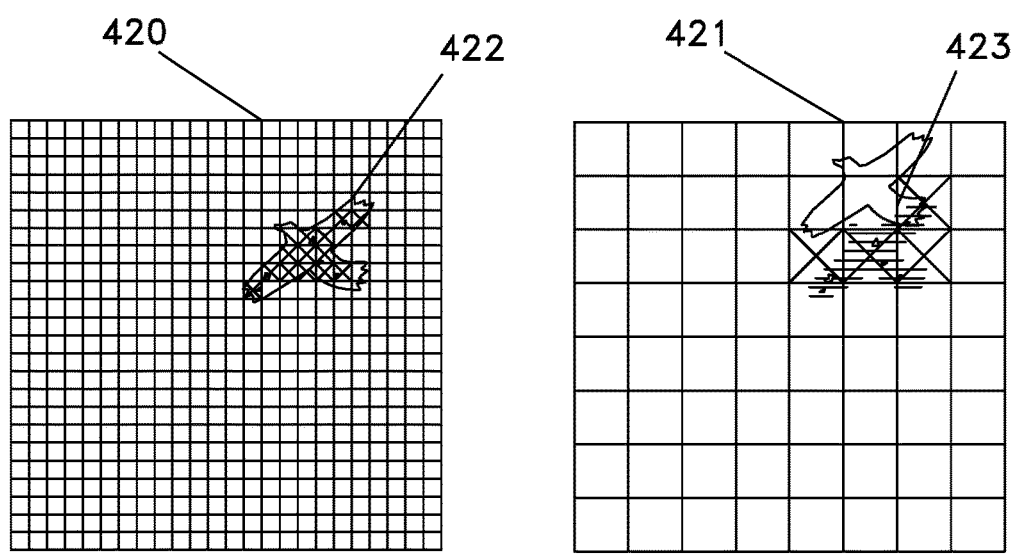

FIG. 19 is a diagram of images produced by the camera of FIG. 18 with two levels of granularity.

Figure 20:
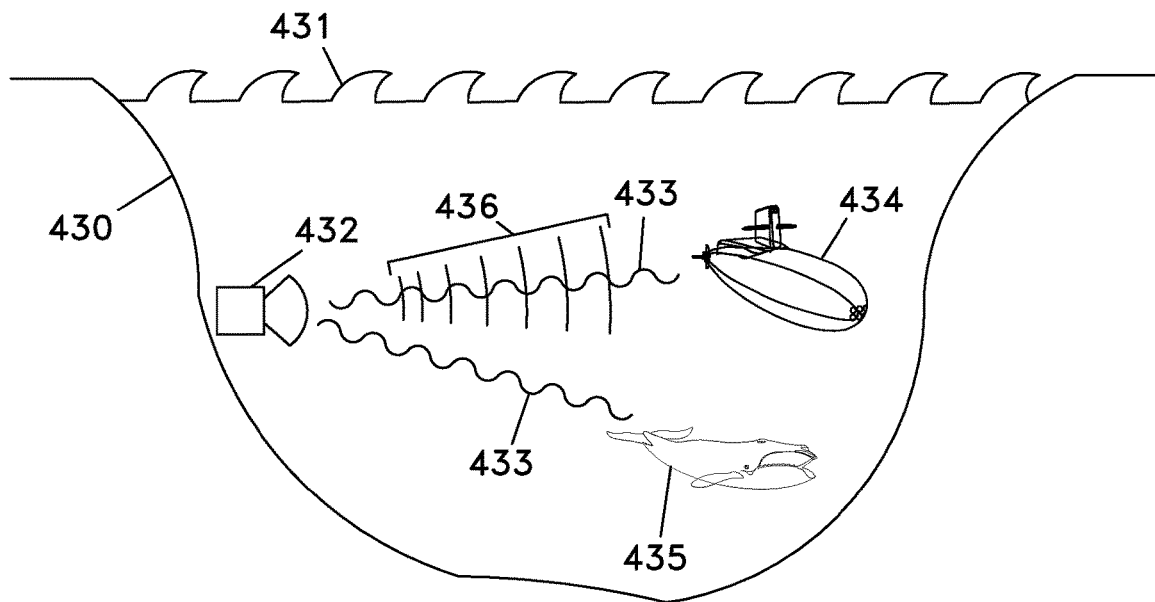

FIG. 20 is a diagram of a sonic system to distinguish large objects in a channel.

Figure 21:
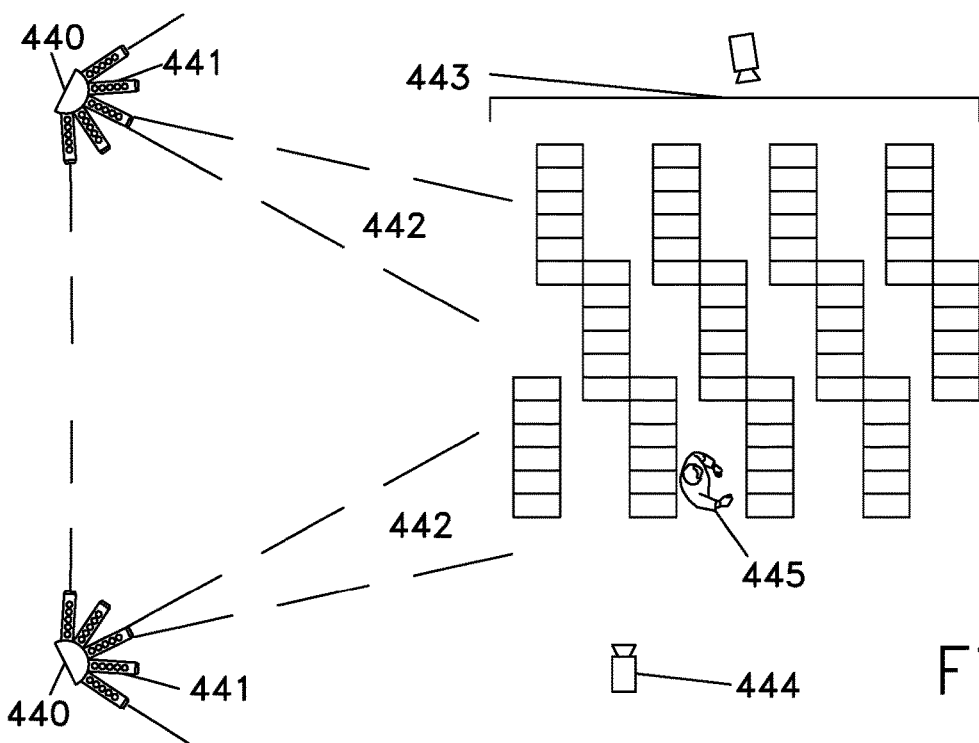

FIG. 21 is a plan view of a system which uses a sonic coarse granularity system for detection and a camera for fine granularity.

Figure 22:
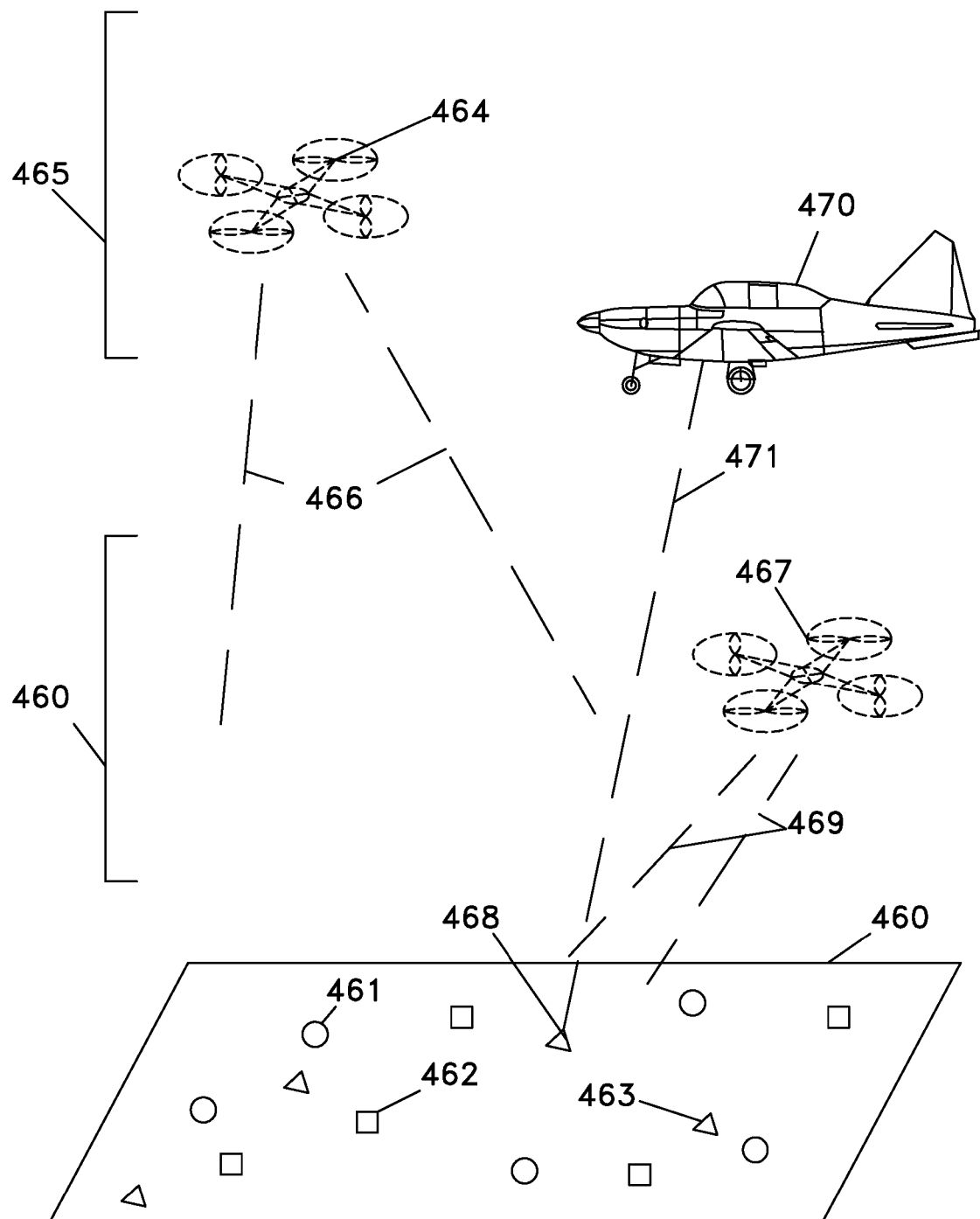

FIG. 22 is a view of a system which used two levels of granularity in observations from separate aerial vehicle.

Figure 23:
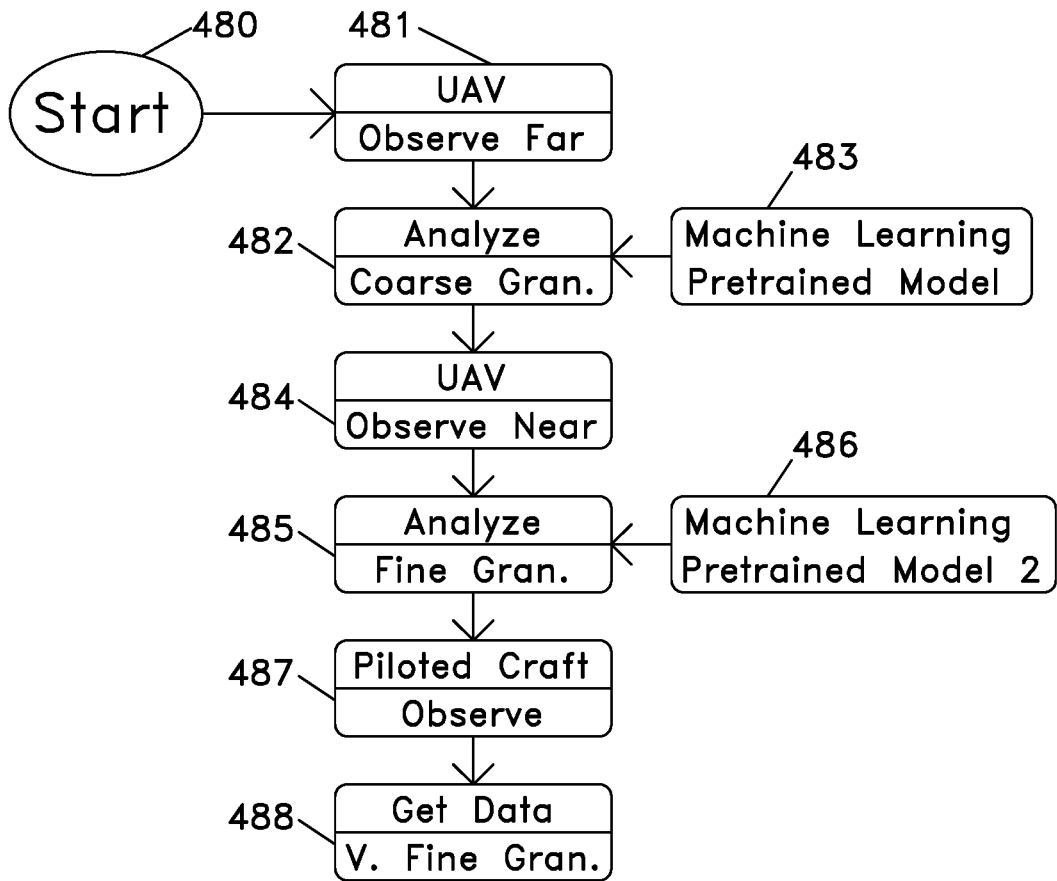

FIG. 23 is a diagram of the functional steps of the system of FIG. 22.

Figure 24:
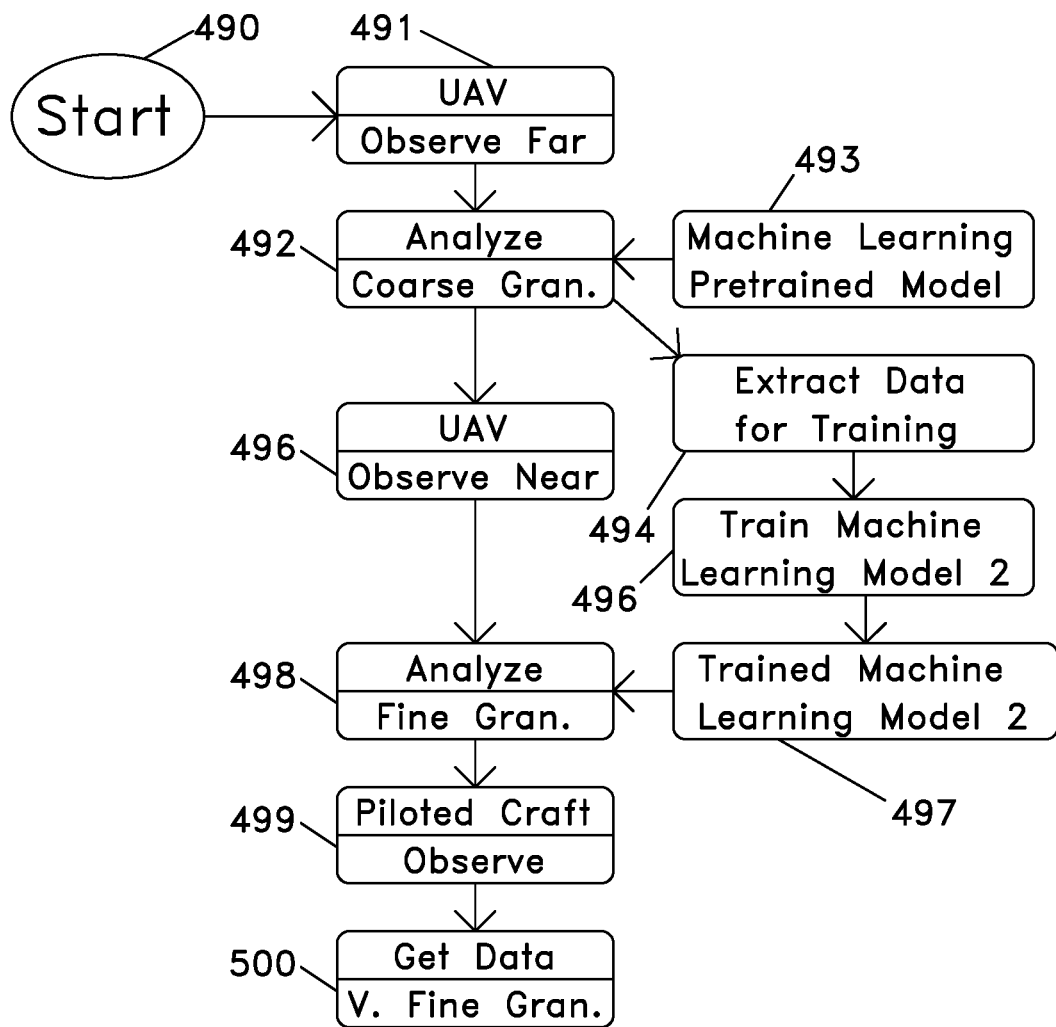

FIG. 24 is a diagram of the developmental steps of the system of FIG. 22.

Figure 25:
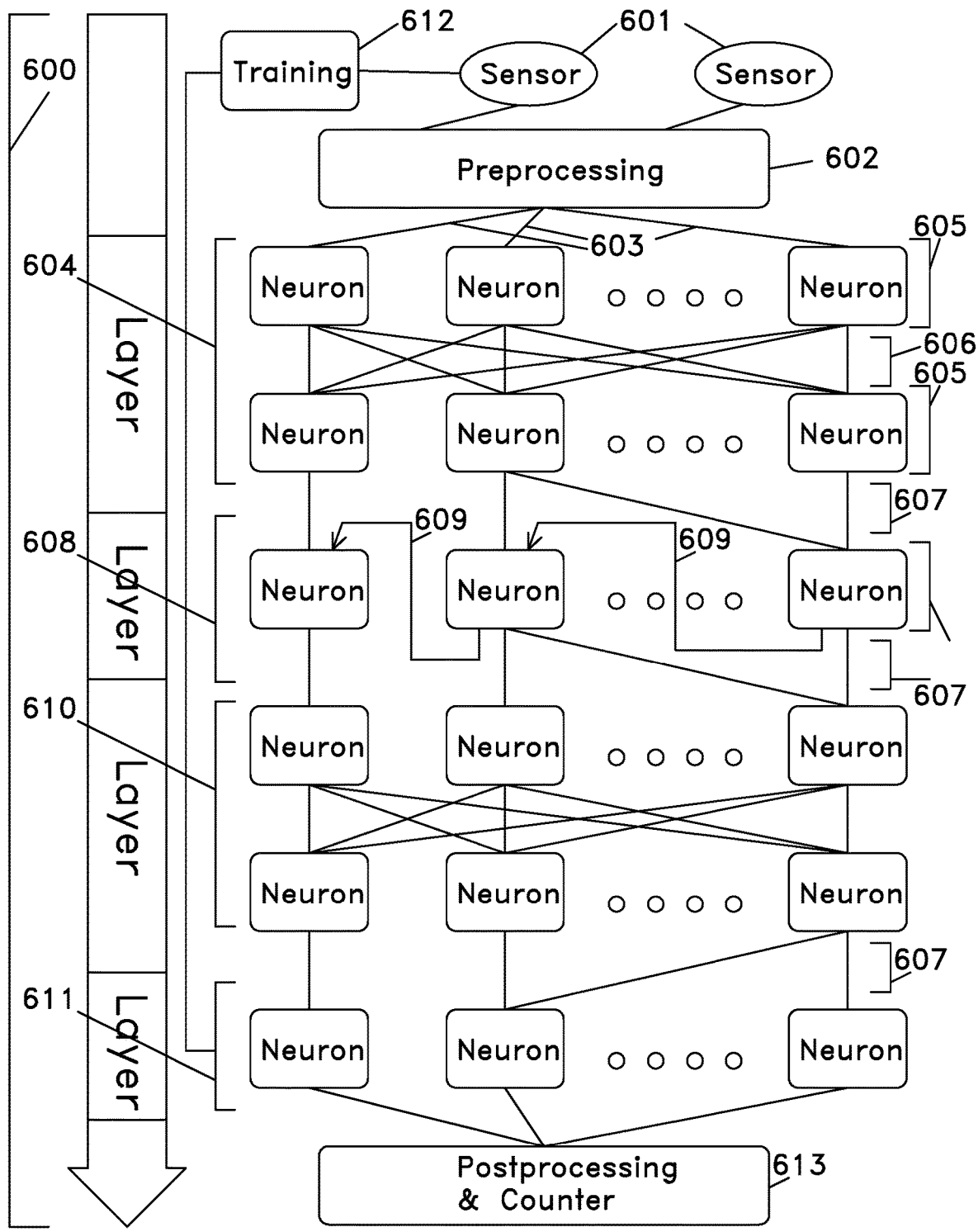

FIG. 25 is a diagram of a portion of a simple recurrent neural net.

Figure 26:
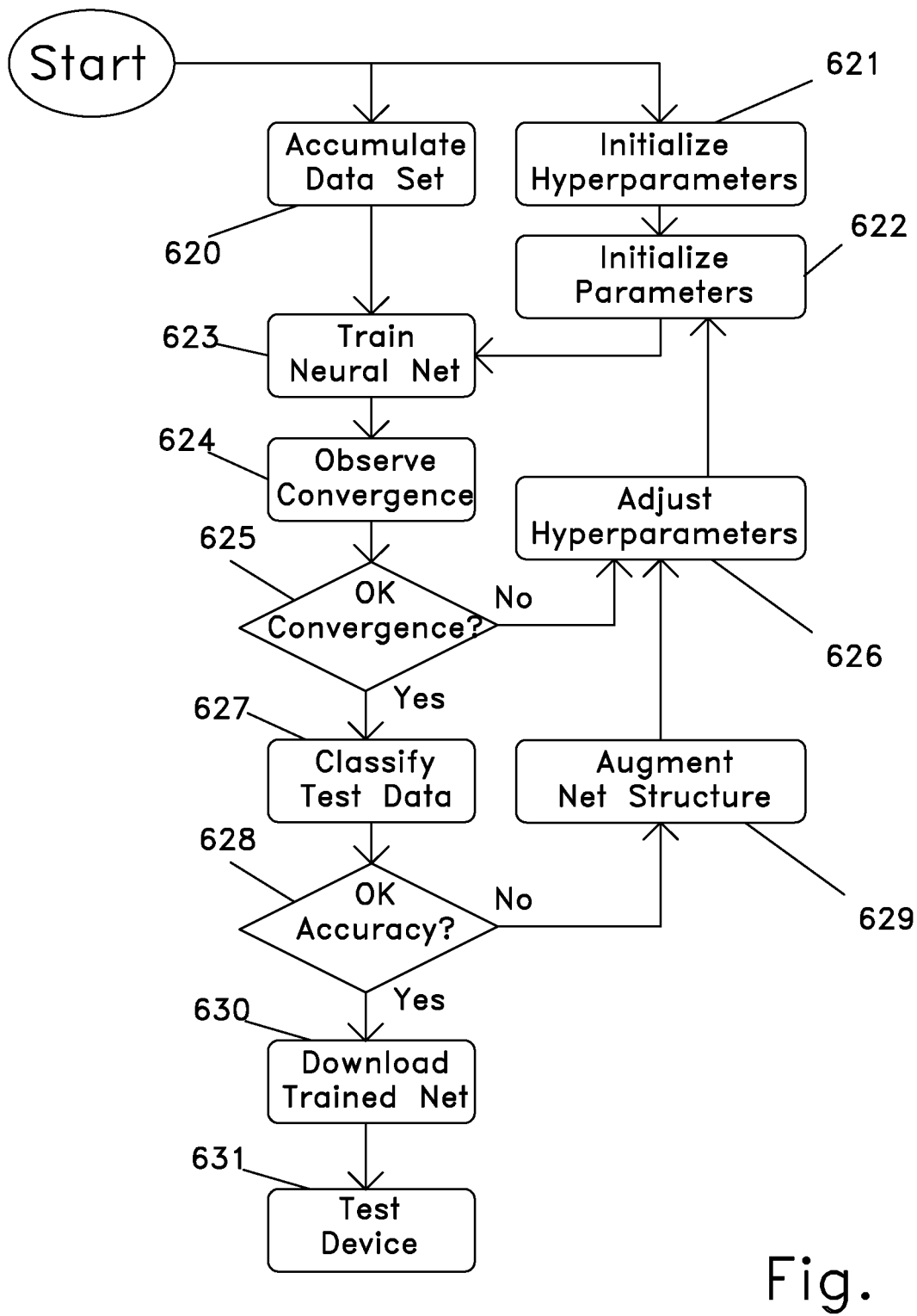

FIG. 26 is a diagram of the process for developing the pattern matching software for a neural net.

Figure 27:
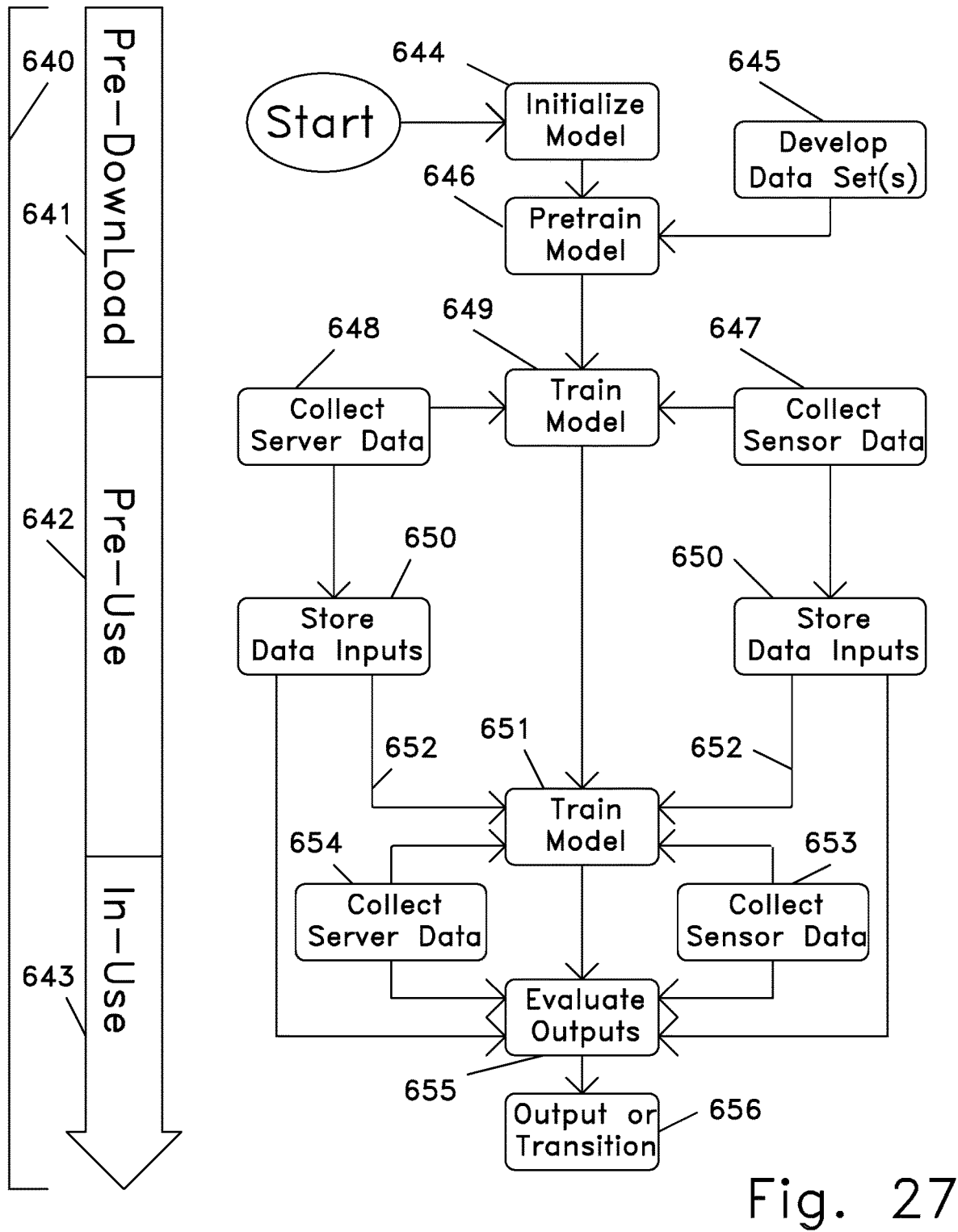

FIG. 27 shows the steps and structure of the basic information flow of a device and its training.

Figure 28:
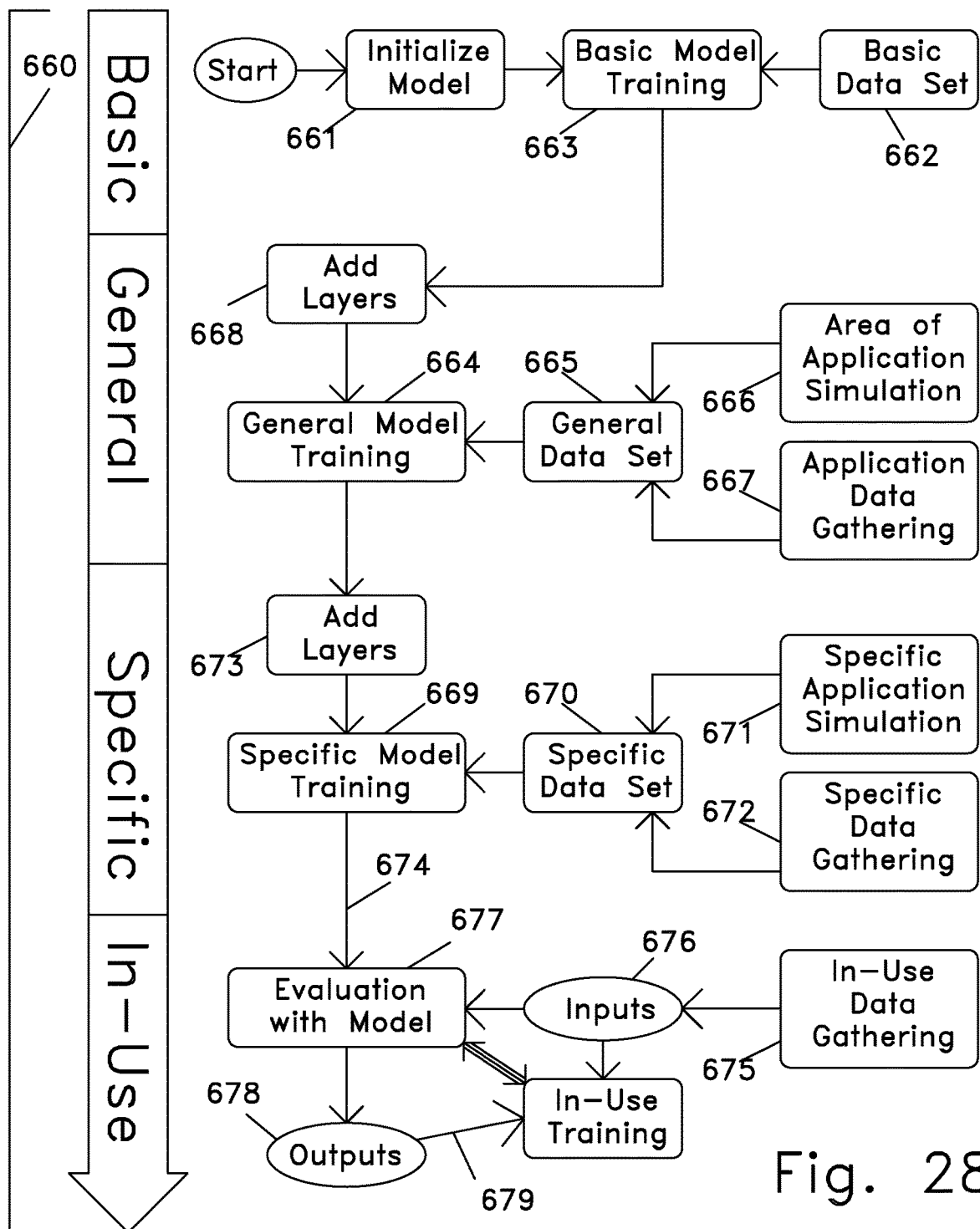

FIG. 28 shows the training and operation steps of the model used to represent data to be evaluated and the situation for evaluation.

Figure 29:
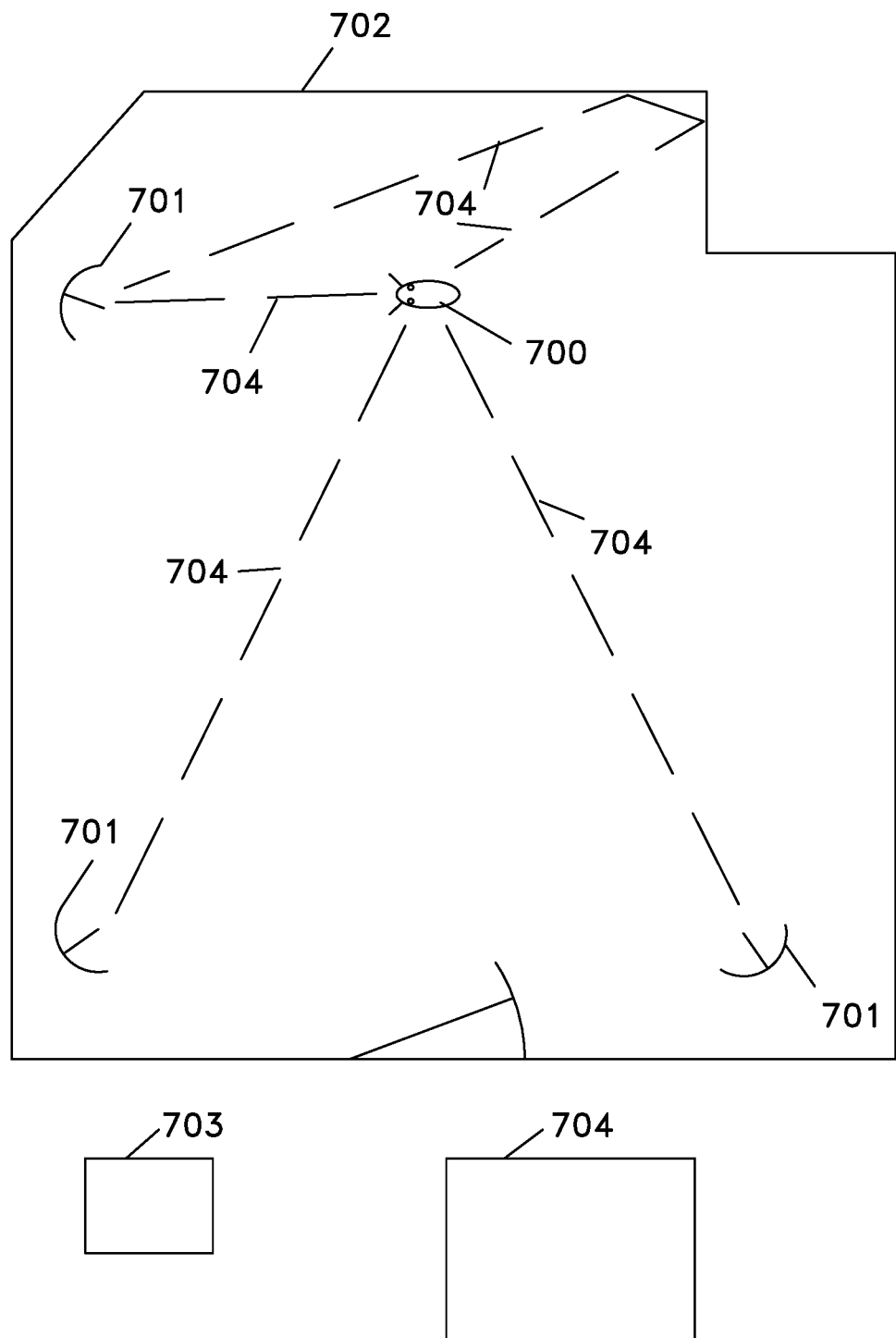

FIG. 29 describes an embodiment where anti-surveillance devices are used to detect an adversary device planted in an environment.

Figure 30:
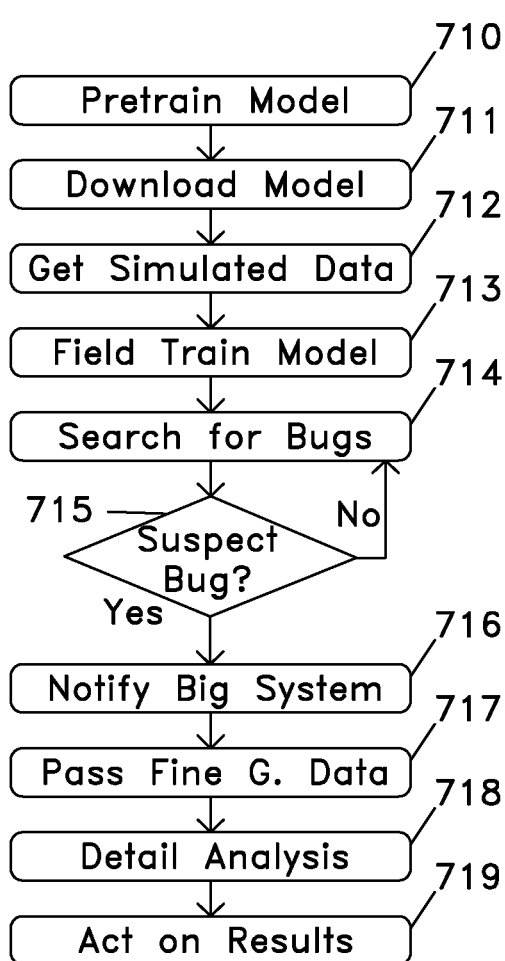
Figure 30:
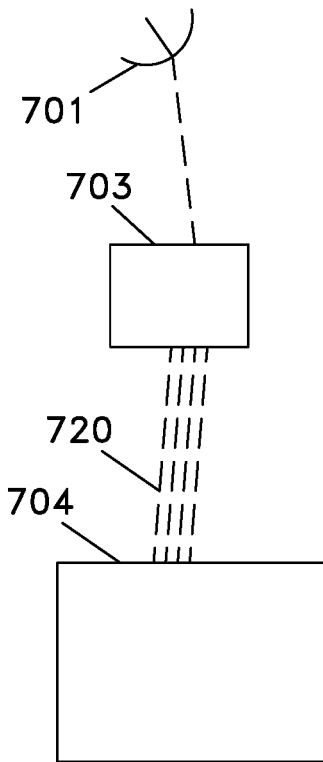

FIG. 30 is a diagram of the operation and development and operation of the system of FIG. 29.

DETAILED DESCRIPTION OF THE INVENTION

Definitions

The definitions given in this section are intended to apply throughout the specification and in the claims.

Detailed Description from the Parent and Grandparent Applications

Detailed Description of the Invention of the Grandparent Application

This is also used by the PARENT application but is not new material. The new material for the PARENT application is below this material from the GRANDPARENT APPLICATION.

Escape Guiding Device

An escape guiding device, here usually called an escape device, is a portable device typically carried by a person entering a venue which collects information as the person enters and moves about the venue. If a threat occurs than the device provides guidance to allow the person to escape from the venue by a means or path that is calculated to allow the safest and quickest egress.

Typical Use in an Emergency Situation

A typical use is when a person has carried the device into a venue and allowed the device to continuously gather information which is used to train a computer learning system such as a neural net. When a threat such as a fire is detected by the device or the device is informed that a threat exist the device generates an escape plan with the model of the situation developed in the learning system. The steps of the plan are communicated to the person who uses them to escape.

Use by Persons with Limited Abilities

The escape device would be especially useful when carried by a person with special limitations on their abilities. For example, a person in a wheelchair who may or may not have the assistance of a second person to help move the wheelchair, could have the device especially developing an escape plan which is suitable for wheelchairs. This may take into account the restrictions or requirements on use of elevators during a fire or panic. Persons with sensory limitations such as blindness and deafness would also benefit from plans produced by the escape device which take into account their situation in relation to the situation in the venue.

The escape device when used by persons with limited abilities would in many embodiments have specialized display transducers. This would include audio outputs; speakers; vibrators; large, bright or flashing lights; and tactile devices. Another mode of use is by persons who use mobility assistance vehicles or modern motorized wheelchairs. The device can communicate with the chair at several levels from using resources of the chair as a display to complete autonomous control of the mobility device to carry the protected person from the endangered venue.

Limitation that affect egress may be sensory, cognitive or related to mobility. Similar considerations may apply to persons who do not have limited abilities but have responsibilities for other persons. This includes caretakers for elderly persons and for infants or small children. It would be necessary, for example, to make a special escape plan for a person who has a very wide baby stroller with triplet infants. Other factors would affect escape plans for devices where the protected person is a child. A child may not be able to compete with a panicked crowd of adults in pushing for a narrow exit.

Professional Use by Rescuers and First Responders

There are several professions where persons as part of their jobs enter into venues with high risks. These include firefighters and other first responders, the military in various operations, nuclear reactor emergency personnel and many other kinds. They can operate in area where conditions change quickly and information on current conditions may be hard to come by.

Venues

The escape device is envisioned as operating in an area called a venue in this specification and in the Claims. A venue here is an area which is sufficiently large to allow the assumption that if a person escapes from the area then that person is safe from an anticipated threat. The most common and typical venue is a building, but for some types of threats the venue may be limited to the portion of a building that accommodates a specific activity or some other area which contains hazardous zone. The extent of the venue is the area where the actual or anticipated threat is potentially operative.

Outdoor Venues

Some threats occur in an outdoor area. For example, a forest fire is a threat that is serious to people in certain situations such as to people fighting that fire. The venue in this case is the area that is threatened by the fire. Other outdoor venues include dangerous neighborhoods, battlefields, and flood plains. The venue is defined by the range and nature of the threat. Another example is in a situation where a car has broken down in a limited access highway intersection. This is an area dangerous to pedestrians and an the venue extends until an area safe for pedestrians is reached.

Special Venues

In one series of embodiments an escape device can be used to escape from the cabin of a passenger aircraft after that aircraft has crashed. On entry to the aircraft the device determines the seat that the protected person is occupying and consults a contained or downloaded database of aircraft layouts to determine the best escape path. Accelerometer and gyroscope sensors can evaluate the nature of the crash and with clues from a camera a reasonable escape path and procedure can be generated.

Another important type of venue is an area where industrial or other technical operations is being performed. When things are going wrong escape from a chemical plant, a reactor site, a ship, or a crime scene may be in order. An escape guiding device is useful in such situation, especially if the protected person is not familiar with the specific location or type of venue.

Threats.

The types of threats that may occasion the need to escape from a venue vary with the nature of the venue; but there are many different kinds in each class of venue that may require such action.

The most well-known threat is fire. Fire can occur in buildings and trap people by blocking exits and creating situations where exit by the standard route or the entry route is impossible or inadvisable. Fire creates a lot of physical clues such as sounds, heat and smoke; but it can also be hidden. Subtle use of sensors and information from servers may be necessary to assess the extent of danger and to create a workable plan to escape the threat or the venue.

With respect to buildings, explosion and collapse are related to fire because the original cause may be a fire. These events are usually sudden, and an escape device is faced with the problem of evaluating data to determine what happened, where it happened and what limitations have been created for an escape plan. In such situations, it is useful to have access to data from servers concerning the details of the venue. Such data may be currently accessed or accessed prior to entry to the venue. It may be used to pre-train the computer learning model allowing additional training from new data concerning the threat event to allow generation of an escape plan.

Wildfire which is commonly referred to as forest fire in certain cases also provides a threat that requires a sophisticated escape. There have been several cases where firefighters in rugged terrain have been suddenly overtaken by flames sometimes with tragic outcomes. In many cases, local sensors would be unable to detect the threat coming; but with server input concerning the threat a computer learning system can combine that information with local sensor data concerning current location and conditions observed in the venue to generate a reasonable path. Such escapes sometimes need to be very quick and continuous computer monitoring of the situation with continuous training of a model would often be needed.

Terrorism and the related possibility of attach by hostile persons for other reasons has become a wide concern. Local sensor data concerning such events as sounds of gunfire, crowd noises and audible instructions from venue staff or other persons can be combined with venue layout and location information in forming a plan.

The listed threats, other causes, and events caused by the dynamics of otherwise unthreatening situations can cause panic. Panic itself can be a danger and threat that exceeds the importance of its original cause. Stampeding crowds have caused many injuries and fatalities. An escape device should in its basic levels of training take into account these possibilities and design escape plans which avoid particular crowd dangers. These include narrow restrictions and cul-de-sacs which threaten a protected person with being suffocated or crushed by crowd pressure.

The threats listed above contain obvious serious dangers to persons; but there are other threats which seem less serious but in certain cases may be important. Nursing home residents, prisoners and other persons with limited abilities to help themselves can be seriously threatened with loss of resources. These threats include loss of power and light, being locked in, loss of elevator service as well as other problems. Even when staff or other personnel are available to help with the situation, the nature of the difficulty or the number of persons threatened may be overwhelming. For example, elevators and building lighting are in most cases backed up by local generators in the event of a power supply outage. Unfortunately, generators often disclose their inoperability only after they are needed. An escape from a high floor in an unlighted stairwell is very difficult. Even if most threatened persons can "shelter in place" it may be necessary to send someone for help or needed supplies.

Escape.

Escape from a venue under threat means to move away from the venue to a place where the threat is no longer a danger. Escape from a threat in a venue means to either move away from the operative area of the threat or to take action which renders the threat inoperative. The person carrying the escape device could be a leader of a group and could be charged with leading the entire group to safety.

A key function of an escape device is to form an escape plan. An escape plan can include a path to travel, conditions to be check for which would modify the plan, and conditional actions in the event of determination of necessary conditions. An example plan could be expressed in words as "travel back to the entrance, but if it's blocked by a crowd go to the side door." The sensors in the device inform the model which would in effect watch for signs of a crowd and redirect movement to the side door if they are found. The plan may contain routes or paths to escape from the specific venue which comprise locations and directions to facilitate movement away from the hazard or venue.

While the entire plan could be made available to a person using the device, in most cases the device would display or convey to the user the next step to take in escape. Keeping the presentation simple may be very important in a sudden threat situation.

Sensors

The escape guiding device can employ information from a variety of types of sensors. These include video or picture cameras, accelerometers and gyroscopes, GPS receivers, receivers for transmissions from remote sensors, threat sensors not a part of the device. The term sensor as used in this specification and in the claims, includes not only sensors that are part of the device but also receivers that collect currently sensed information and are provided by the venue or third parties. It also includes a GPS receiver where the receiver generates location information from timing details of the received GPS signals.

Cameras

A camera either still or video can gather information. Machine vision software is now available which will recognize situations and objects and can provide a critical input to a computer learning system. Such learning systems often work in several layers and provide learning at a high level in a manner using generic detail recognizing systems at a lower level.

Accelerometers and Gyros can be used to detect movements of the device or the person carrying the device. In the phase prior to detection of a threat, such information can be correlated with venue layout, GPS and other information to give a more detailed picture of the entry path. Slowdowns, halts, and diversions on entry may or may not be clues to potential difficulties on egress. That may be determined by correlation with other information. In the escape phase after a threat is detected other movement events are important information. Slowdown, halts and diversions as even more important here. Other events such as a person falling or being knocked down can be detected and taken into account. The rate of movement and details such whether the movement of the person escaping are important Microphones Microphones can be used to detect conditions around the escape guiding device in several ways. If multiple microphones are in use and have directional sensitivity that can be correlated with directional information from sensors.

One category of useful sounds are those made by other persons in the venue can give important clues to the movements of persons, to the number of persons in various area and the experiences that persons are having. It may be possible by using analysis of the sounds of persons to detect potential escape routes which are blocked or where panics are occurring.

Another category of useful sounds are those made by the threat itself. Fires and gunshots as well as the panicked crowds mentioned above have characteristic sounds which are subject to analysis.

A third category of useful sounds are announcements and other information given by the venue operators. Sensitive microphones and analytic software can interpret these sounds where they would be covered up by other ambient sounds as they are heard by persons.

Miscellaneous Sensors

Other types of sensors which may be useful include magnetometers which can give an absolute direction from the earth's magnetic field in certain cases and thermometers which can detect heat from threats and changes of temperature from outside area in cold weather.

Output Device.

The term "output device" is used in this specification and in the claims rather than simply "display" to convey that the output of warning and guidance for the protected person may be in modes other than the common visual screen. Especially with persons of limited abilities and for most persons in difficult environments, a visual screen may not be the best way to convey the needed information in a way to get timely escape action. Some output devices work by conveying information to a person and some by conveying information to equipment such as an autonomous vehicle which acts on an escape plan.

Some output devices are visual. They can be general display screens which can show pictures and text and provide detailed instructions. These can be integrated with input devices such as touch screens. Other visual output devices include lights which can be flashing to get attention and mechanical devices which raise flags.

Some output devices are audible. This includes speakers and earphones as well as sirens which may be operated over a communication link.

Tactile output devices include vibrators, braille devices and specialized devices which operate mechanical signifiers.

The escape device can operate vehicles as the primary or an additional output mode. In other cases, the escape device can operate elevators, doors, open gates and substitute for a key or pass code to allow exit.

Beacons

Beacons can be placed in the device by the venue operator. The beacons can operate by radio, infrared or other communication means. An ordinary Exit sign is in effect a beacon. Such signs may incorporate beacons that operate in other modes for use with escape devices. More sophisticated venues may come to offer services with venue information at their locations. In the future, digital escape information may come to be required as an extension of the services for direct communication to humans. Current flashing fire warnings, sirens, buzzers, exit signs etc. may have digital equivalents and augmentation. An intelligent escape device would take advantage of such information as much as possible.

Processor, Machine Learning and Models

A device to use gathered information to guide a person from a venue where a serious hazard exists requires very sophisticated computer system to complex problems in interpreting incoming data and generating a plan for escape. In general, it is not feasible to discover all of the rules and relationships necessary to solve that problem and to write a determinative computer program that produces a sufficient result. However, methods have been developed and are wide and increasing to use a set of examples which is processed and used to product a set of rules which working together can find answers suggested by the examples. A substantial set of examples and a large amount of processing are required but many people are trained and are being trained in application of well known methods to implement this approach on a wide variety of problems.

There are limitations on the kind of problems that can be solved with this approach, but the problem here is well suited for the approach because of the specific input data that is to be gathered and because of the specific kind of output that is required.

Machine learning as used here and in the Claims is a term for the type of artificial intelligence that is implemented without explicit programming to generate solutions to the problems confronted. It is focused on the development of solutions by having the effective program change as it incorporates data in such a way that it converges on an ability to produce the required solution.

Model

The term model as used in this specification includes representations that do not explicitly describe the system modeled but which are designed or trained to produce information based on the behavior of the system. It includes pattern matching system such as a neural network which has been trained on data exemplifying the system. In that case the model consists of a, probably huge, array of parameters that determine the operation of the individual neurons in the neural net program. Training would work by systematically adjusting the values of these parameters on the basis of the training data.

Detailed Description of the Invention of the Parent Application

Standards

A standard as used in this specification and claims is a specification of a condition on which the granting of a privilege is conditioned. The standard can be expressed in words directly defining it or in a procedure which results in a decision determining whether or not the condition warrants the granting of the privilege. The procedure can be defined in words or by means of a device which evaluates the condition.

Physical Standards

A "physical standard" as used in this specification and claims is a standard which depends on the existence of physical attributes which can be evaluated, possibly in the context of non-physical attributes, to determine compliance with the physical standard. Examples include the presence of a necktie or other class of object, size of an object, and the presence of certain text. Physical standards are not necessarily based on static attributes but can be based on upon actions produced by physical objects or physical actions of persons. These actions may be conditional on certain stimulations or environments.

This specification disavows the full scope of the term "physical standard" by excluding physical standards which consist wholly or primarily of identification of a specific person or object. This limitation is intended to invoke the decision of *SciMed Life Sys., Inc.* v. *Advanced Cardiovascular Sys., Inc.*, 242 F.3d 1337, 1341 (Fed.Cir.2001) ("Where the specification makes clear that the invention does not include a particular feature, that feature is deemed to be outside the reach of the claims of the patent, even though the language of the claims, read without reference to the specification, might be considered broad enough to encompass the feature in question.") Therefore, a physical standard that consists of requiring any person with certain characteristics or a license tag from a certain jurisdiction on a vehicle be present would be included in the definition; but, a physical standard that requires only that a specific person or a specific license tag number be present would not. A standard may comprise a portion that constitutes a physical standard in conjunction with a portion which is non-physical or which is excluded above as a specific identification.

Compliance with Physical Standards

Because it is generally impossible to implement rules sufficiently detailed to determine compliance with any set of rules in specific cases, a decision mechanism is necessary to apply rules. If the decision mechanism is automatic and based on a program containing a more extensive system of rules than that the published rules, it too is likely to have situations which are not decidable. Such systems are common. Systems based on human judgement range from the decisions made by "bouncers" at the door to nightclubs to the U.S. Supreme Court. Unfortunately, these systems typically do not allow persons wanting to determine in advance what to have or do to be in compliance. Irreversible actions to achieve compliance may fail with the failure only determined at the last minute. Systems based on human judgement are also subject to variation from decision to decision and from judge to judge due to unavoidable variations in human behavior.

Physical Attributes

Compliance with standards is determined on the basis of information available to the decider. There are several distinct classes of information used for this purpose including information from records, information testified to by a witness, declarations of fact from an applicant, declarations of intentions and physical attributes of a person or object relevant to the standard to be applied.

Physical attributes are those that are evaluated in a particular object or person at a specific time. For example, the current length of a person's hair or beard is a physical attribute. A camera or video image of a document is a physical attribute of that specific copy of the document, but the validity, uniqueness or meaning of the document is not in itself a physical attribute.

Testing of Compliance by Evaluation of Physical Attributes

In many cases standards can be expressed by requiring some state of a physical attribute. For another example a nightclub can express its standard aimed at insuring that all customers are of legal age to buy alcohol by requiring that they have a governmental document with a picture certifying the age. This would be a document such as a driver's license. The physical evaluation to test compliance would be to compare the picture to the person seeking entrance. Human comparison of pictures with actual persons is very slow and unreliable. The comparing person is likely to be distracted by irrelevant characteristics such as hair style and eyeglass designs. A substantial proportion of people have a condition, called prosopagnosia or face blindness which interferes with processing of visual data concerning faces. A person seeking admission risks embarrassing rejection at the same time the venue risks admitting improper persons.

Another example can be seen in a requirement that a vehicle tag renewal sticker be attached in a specified manner, such a being right side up and in a specified place on the license tag. This could be tested by an application downloaded on a user's personal device (cell phone) which would evaluate a picture of the installation, giving the user confidence that the installation is correct.

Machine Learning

Machine learning is a well-developed and understood method of creating devices that are capable of solving problems that defy development of programmatic solutions that rely on understanding in detail the working of the system to be analyzed. A famous example is the modern language translation systems widely used on personal computing devices. Development of programs to translate languages has produced poor results because of the complex and subtle structure of human languages and the scale of the problem. But systems have been developed to be trained on a large (possibly hundreds of millions) number of examples of language usage. The trained models are then applied to an input in one language and provide output which is very likely to be a satisfactory translation in another language of that input.

Machine learning systems are very different from computers running programs written to model problems to be solved. While the implementation of a machine learning system may be made by means of a computer program, this is not the only way to implement machine learning models. An array of analog devices (usually called gates) can implement the model in a massively parallel way. Rather than containing a program, a machine learning system constructs a model which transforms an input through a huge number of gates to produce an output which has a statistical meaning. The operation of the gates is modified in the training steps until the behavior of the model converges on a tendency to produce desired results.

Machine Learning System Models

A machine learning system model or just "model" as used in this specification and in the claims is a large set of parameters represented as data or physically and arranged in such a way that they can be adjusted by a training process based on a collection of data that represents the system being modeled. The model also allows inputs that represent a particular state or set of states of the system to be analyzed by use of the model. The use of the model transforms the inputs into a set of outputs that constitute an analysis of the states being analyzed.

A model can be applied to a set inputs by means of an algorithm executed by a processor or by means of a physical analog device to perform the transformation. The algorithm or device is only the means of evaluation and is distinct from the model which is the set of trained parameters and the structure in which they interact.

Model of an Area of Application of a Standard

The model being trained can be trained using data from examples which are demonstrative of compliant and non-compliant situations, objects and behaviors which are more general in scope that the particular case to be examined in a final evaluation of the model. This produces a model of an area of application of a standard more general than one which is trained to a specific context. This would typically be done on larger processors without real time constraints prior to downloading the model to a device for use in specific contexts.

Training a Model

In this specification and in the claims the process of training a model consists of applying data representing possible inputs to the machine learning system with the model in its current state of possibly partial training. The outputs of the system are used to generate incremental adjustments to improve the transformation of the inputs into outputs better representing the desired behavior of the system.

The usual way to determine the adjustment to be made to the model for each group of inputs presented is to calculate or measure the effect on the outputs of each parameter in application of that set of inputs. If the effect is favorable in providing outputs that correspond as wanted to the inputs then the parameter is very slightly augmented to improve the overall behavior of the model as trained.

There are many ways to accumulate the data sets used for training. One way is to find or set up a large number of examples with known outcomes and collect the data from them. Another way is to write an algorithm which generates examples. The examples can be graded by people or the generation method may be able to predict the outcomes. Some problems are easy to solve in reverse; i.e. a set of inputs may be easier to get from a assumed output than to find the output from a set of inputs. For example, to train a system to distinguish pictures of dogs from pictures of cats one can get pictures from public sources such as the internet and use humans to label the species depicted. That set can be used to train a model which can test other pictures.

Convergence

The training process is continued for each item in the training set data. Because it is important that training result in a stable and gradual progression of the model toward the desired behavior teach round which uses the set of training data items only changes the model by a small increment. The rounds are repeated many times and the results are compared to data reserved for testing in order to measure the effectiveness of training. If the structure of the model is well chosen than parameters will converge on values that produce the desired outputs for various input sets.

Training in Levels

Models can be arranged in levels both for training and for evaluation of inputs. The application of the model to a set of inputs generates outputs that describe in a higher level of generality the meaning of the inputs. Those outputs can become inputs to further structure which is a model for a more general transformation of the original inputs toward meaningful outputs.

In this specification and in the claims, a level of training is the training of a portion of the parameters of a model to produce outputs that are trained until a state of convergence is attained and made available for input the next portion of the model. That is, distinct levels are made distinct by separate training to convergence. It is possible to simultaneously train multiple levels, but they are distinct levels when they are separately tested for convergence. A level that is not tested for convergence but which uses inputs from a level that has been brought to convergence is a distinct level from the level providing the inputs.

Typical models are in at least four levels. The first which here is called the Basic level takes raw sensor input and describes it in terms directly definable based on the input data. Examples would be detection of edges from visual data and of tones, harmonics and burst timings for audible data. The second level which is here called the General level is to identify objects and events from the output of the first level. Examples would be to detect a person crossing the path of the sensor or identifying a sound as a gunshot or crowd noise. The third level, herein called the Specific level is to allow the model to identify actions and objects appropriate to the purpose of use of the model. Examples of this level include model layers to implement steering or acceleration of a vehicle or determination of compliance with a standard in a specific type of situation. There is also a fourth level called the In-Use level in many implementations. This level incorporates data collected while a model is in use which modifies the model to allow evaluations at a later time to take into account earlier inputs or evaluations where a series of evaluations is made.

Implementation of Training on a Processor with a Memory

Training requires a very large amount of processing to apply the large amount of data in the training set repeatedly to incrementally cause the model to converge on the desired behavior. If the adjustments from one pass through the data are too large, then the model may not converge or may not allow the effects of all of the inputs to diffuse through the model structure and correctly operate. For this reason, specialized very powerful processors are used for training. They are not appropriate for incorporation in portable devices because of considerations of size and expense.

Basic Training

In this specification and in the claims, basic training refers to training which is used to interpret inputs from sensors or raw data from data sources to identify aspects of objects and actions treated as objects that are implied by the data and too general in nature to identify the potentially detected objects at this stage. Examples include edge detection, categorization of sounds by location of the source, face detection, orientation in space, counting objects, elimination of backgrounds and many other general tasks of interpretation.

A portion of a machine learning model with this training can be used for many applications and could be supplied by a specialized developer. It's training would be brought to convergence and the outputs supplied to the next level of training when the model is used to evaluate inputs either for further training of other levels or in actual use.

Data for General Training Describing the Area of Application of a Model

Data for the general level of training can be acquired by collecting a number of real examples or by generating examples with a program to produce examples and training data. In this and in other levels, it is often much easier to produce a program for generating examples for machine learning than to determine specific rules to allow determinative non-learning algorithms for evaluating rules designed for human understanding.

Data for Training Concerning Compliance with a Standard

There is often available a set of examples to be made into training data from prior application of a rule set. For example, a dress code model could be made by using video collected over a period of time of people entering a venue. The videos could be graded by whether persons are admitted or turned away by entry personnel. This would allow automatic generation of a training set by processing the videos.

Transferring a Trained Model

Levels of training of a machine learning model can be divided into two classes. The first class is those levels that require very large amounts of processing power and time to train. These typically use large training sets and are done before other levels. They include in most cases the basic training levels which are concerned into extracting interesting features from raw data usually from sensors and the general training levels which concern coordination of features in sets of circumstances which are designed to encompass the specific situation to be evaluated. These levels cannot be conveniently handled in real time and on a processor convenient to take into the field to perform evaluations.

The second class of levels are those that must be performed after the specific situation to be evaluated is determined. They must be performed in real time and on processors available at that time. The model trained by the first class of levels can be transferred to a more convenient processor for the second class of levels of training.

Data for Testing Compliance with a Standard

After a model is trained in several levels and downloaded to a processor to use the model to evaluate situations, data must be collected with an appropriate sensor. The data is provided to the processor as input to the model for an evaluation to produce outputs. The outputs may have further non-machine learning processing to produce a determination of compliance with the testing physical standard.

Acquisition of Testing Data with a Sensor

A portion of the data collected or generated at each level is reserved for testing. This data is not used for training to enable testing the model without concern that the model might be effect only with the specific cases used for training.

Determination of Compliance

Once the model is trained through all relevant levels, it is used to evaluate a situation to be tested for the state of compliance. Data is collected by use of sensors, servers or other sources and supplied as an input to the machine learning model. Processing the input through the process defined by the model generates outputs. These outputs are used to determine compliance.

Detailed Description of the Several Views of the Drawing

Drawings from the Grandparent Application.

Figure 1:
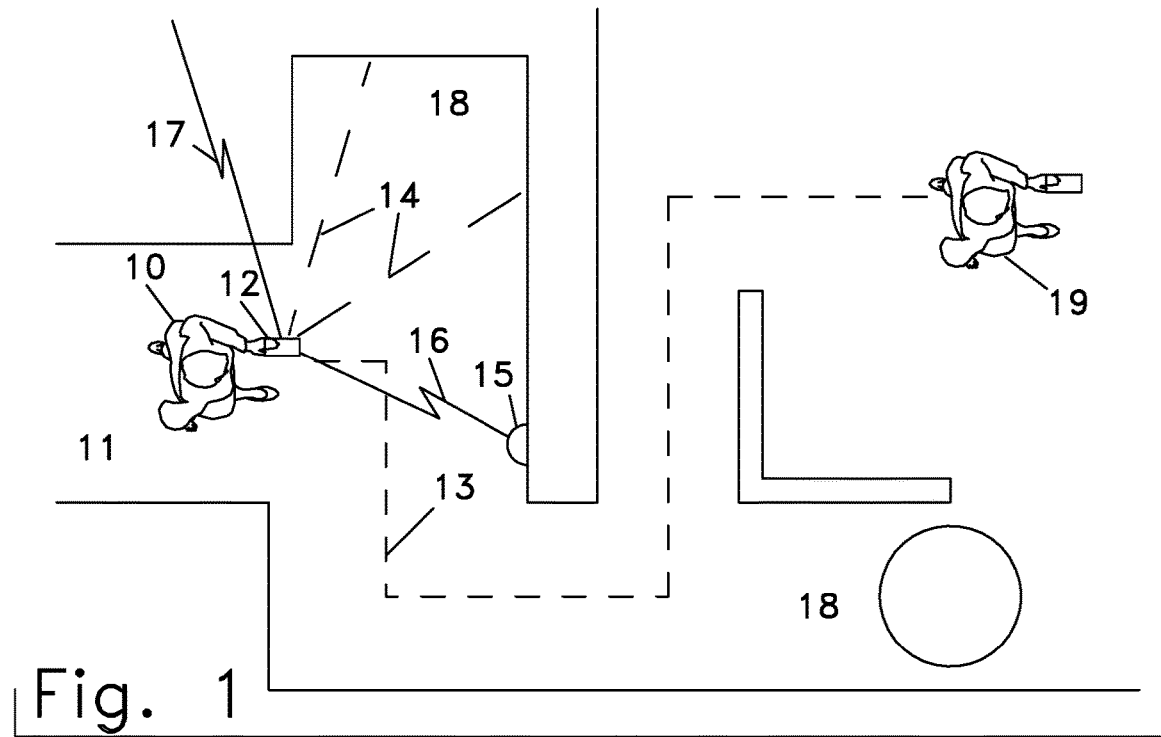
FIG. 1 through FIG. 10 appear in the grandparent and parent applications.

Referring to FIG. 1:

A person 10 to be protected is entering into a venue at an entrance 11 carrying an escape device 12. The device gathers information as the venue is entered and the person progresses through the venue along path 13. The device gathers information from sensors which may include an optical camera(s) with a field of view 14 and self contained sensors such as an accelerometer or gyroscope. A beacon(s) 15 in the venue may provide additional information to the device with a suitable signal 16. The device both before and after entering the venue may receive signals 17 from the outside servers which provide various kinds of information such as location (gps), venue layout, pre-calculated paths and parts of paths and many other kinds of useful data. All or portions of the calculation burden may be offloaded to external servers. The protected person proceed along the path which may contain various possible areas 18 where on return false turns may be taken or additional dangers may exist. The inner parts of the venue are the destination and the activities for which the person has come take place 19.

Figure 2:
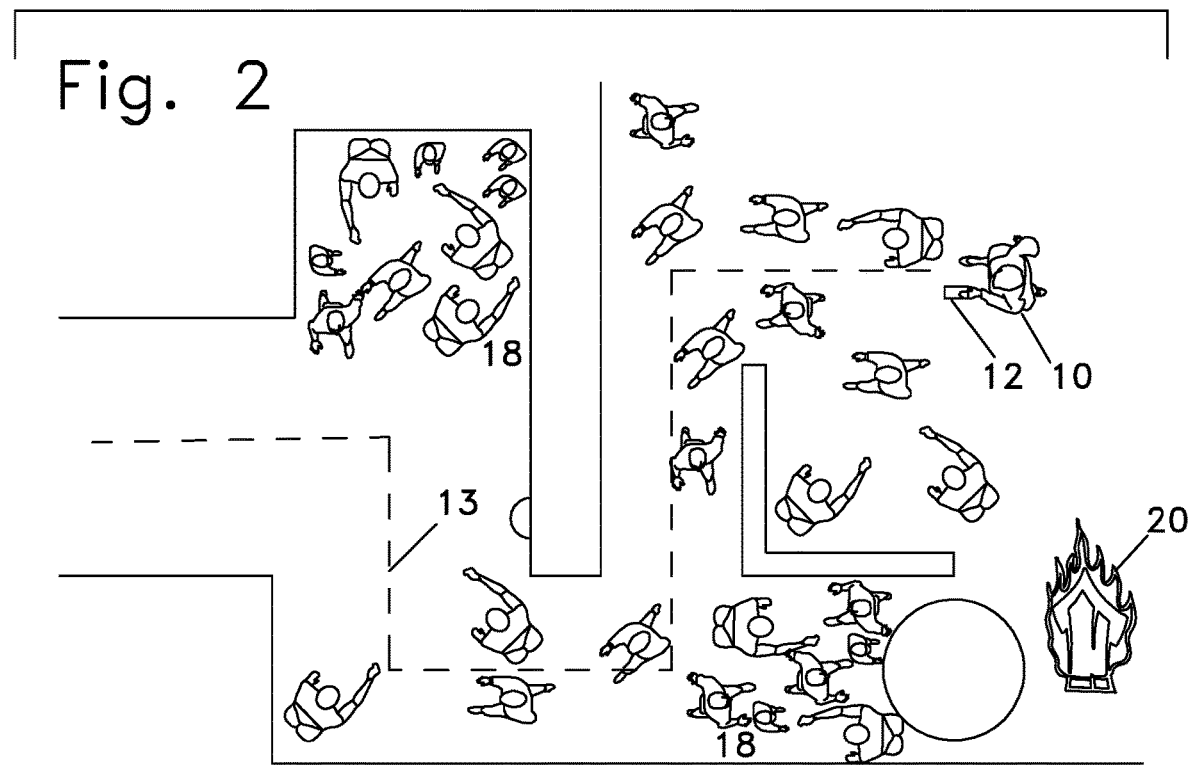

Referring to FIG. 2:

The person 10 from FIG. 1 is in the inner part of the venue with the escape device 12 when a threat 20 appears. The threat depicted is a fire which has broken out. A large number of other people have entered the venue. If the venue is full of panicked people as depicted (numbers are omitted for clarity) and the lighting has failed, efficient escape may be difficult. In many cases the best escape is not back through the entrance path, but in the depicted case that path has been chosen by the device and is shown as 13. Two cull-de-sac's 18 are shown. They may not have been noticed by the protected person on the way in; but they are each holding a crowd of people who think that is the way out. Without the help of the escape device, the protected person may choose to join the people trying unsuccessfully to force an impossible exit.

Figure 3:
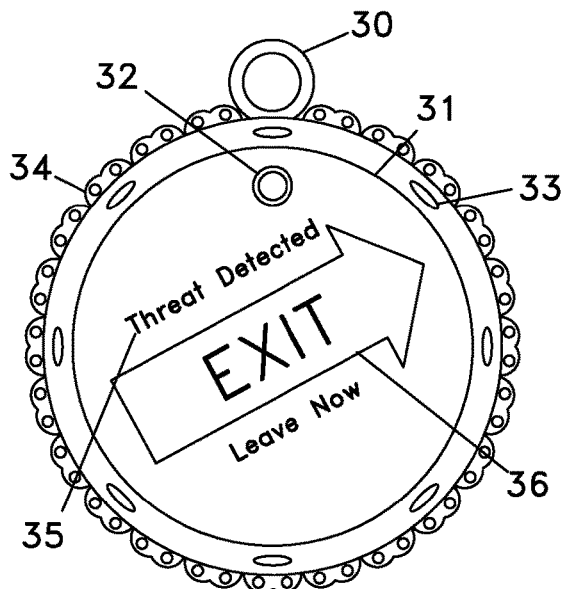

Referring to FIG. 3:

A front view of one embodiment of an escape device is shown. The depicted device is designed to be worn on a chain, ribbon or lanyard around the neck of a protected person with a provided eye 30 for attachment. The central area 31 of the device is a display screen which gives instructions in case of a detected hazard and shows a decorative screensaver chosen by the user at other times. A camera 32 is used to gather information on entry to the venue as the device hangs around the protected person's neck. Eight sound ports 33 lead to microphones which gather audio information to be analyzed for content, timing and arrival direction. A fringe 34 around the device is for decoration and to help distinguish the two sides of the device. As depicted the device is showing the detection of a threat 35 and is beginning the process of guiding the protected person from the venue with exit directional information 36. The screensaver decorative display has been replaced with a warning.

Figure 4:
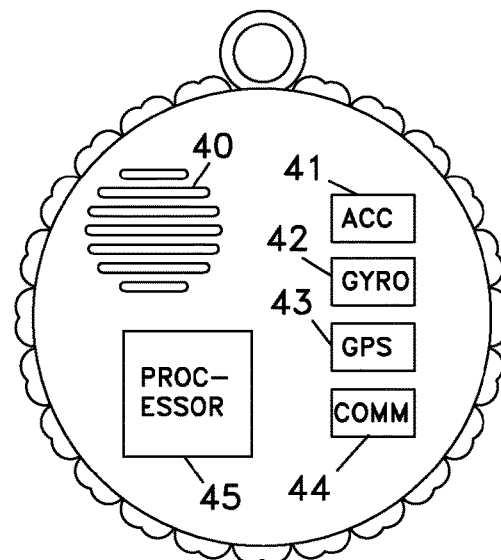

Referring to FIG. 4:

The back of the device is shown. It is cut away as necessary to show interior components. A speaker 40 is included to alert the user. Various input and sensors are shown including an accelerometer 41, a gyroscope 42, a GPS receiver 43 and a communication device 44. The communication device can be used for many purposes such as receiving beacons from the venue, information about the venue from an outside server, access to outside processing assistance from a server or download of pre-trained parts of a pattern recognition or neural network for the device. Use of the outside servers allows function with a reasonable processing load on the devices own processor 45.

Figure 5:
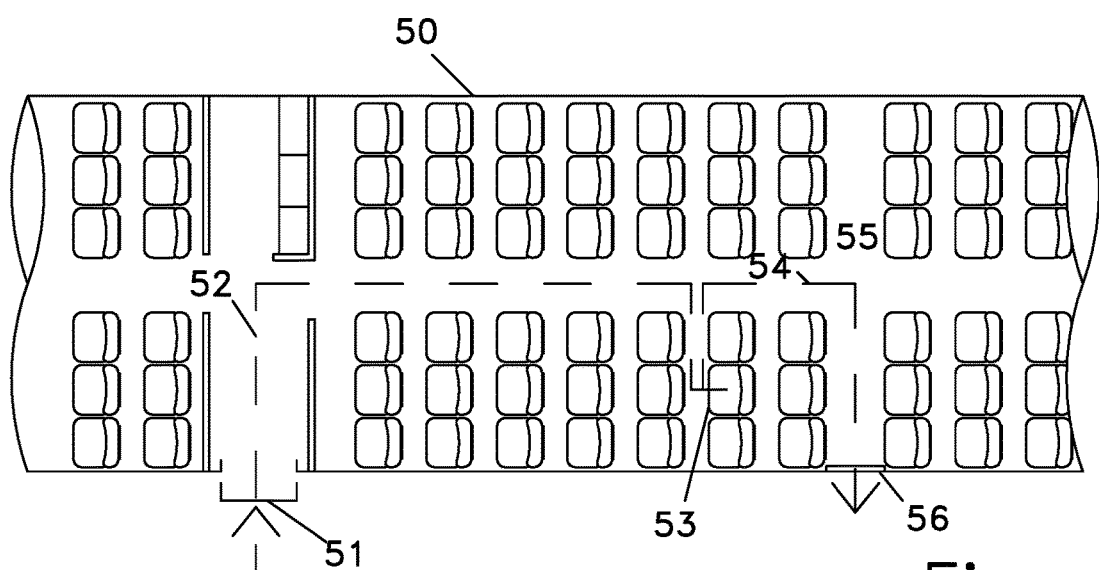

Referring to FIG. 5:

A venue is depicted where the escape device is adapted for escape from an aircraft cabin 50. The protected person enters from the normal cabin door 51 along path 52. The protected person arrives at assigned seat 53. The device integrates information downloaded from servers such as the persons assigned seat, the layout of the particular aircraft for this flight, the anticipated number of passengers and the scheduled times of the flight. This information is used in combination with information gathered by the sensors as the protected person enters the aircraft and after a hazard is detected. If a hazard situation is detected the escape device evaluates all available information and plots an escape route. In the instant situation, the escape route 54 is not toward the entrance door but is in the other direction to the exit aisle 56 which leads to an emergency exit 56.

Figure 6:
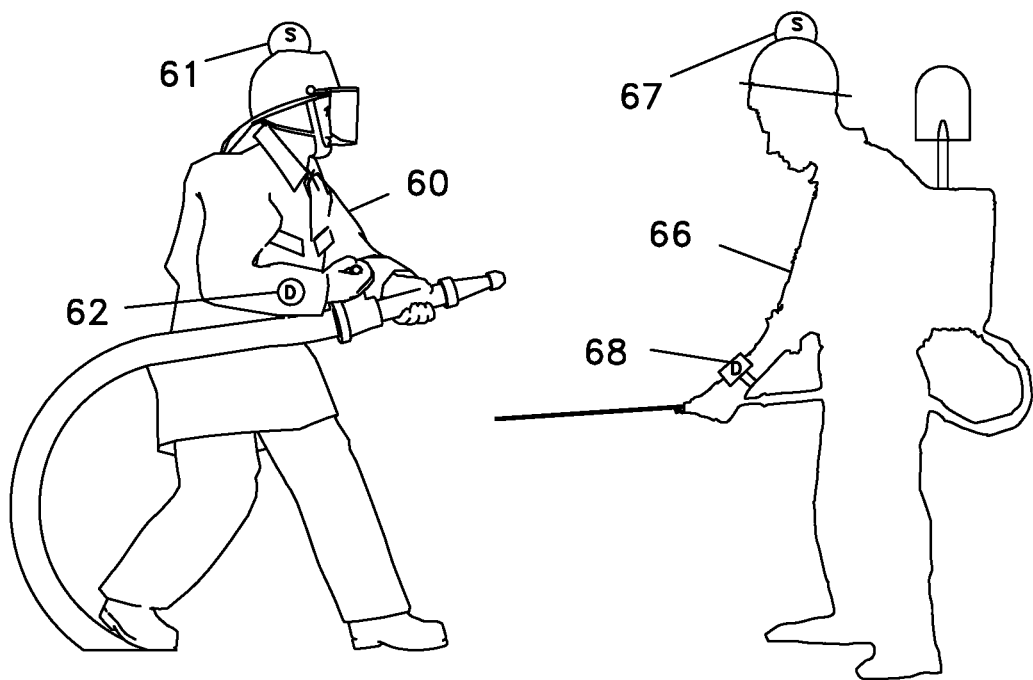
Figure 6:
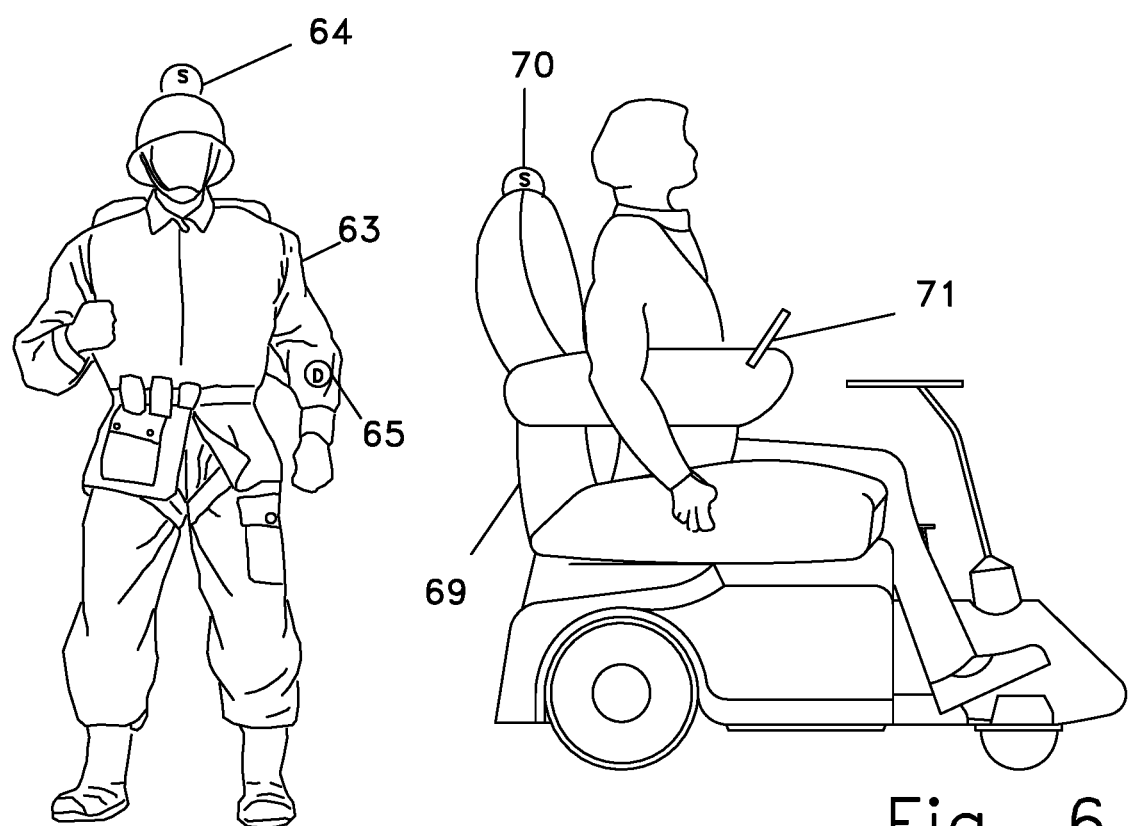

Referring to FIG. 6:

The inclusion of an escape device in the equipment of persons in various roles is shown. The device is designed to be able to access servers and the environment with sensors and communication device, perform it's analytical role and provide escape information to the user. It may also be integrated into other equipment associated with the protected persons role both for purposes of gathering information and for outputting escape paths.

One situation where integrating an escape device into a person's daily equipment is in the case of a firefighter 60. The device could have sensors 61 and a display and warning device 62. In this case it would be helpful to provide specialized sensors such as infrared heat detectors. If the firefighter comes to a closed door with intense fire on the other side, it is dangerous to open that door. Firefighters are so trained, but forgetting this critical rule is a source of many injuries. If the firefighter is attempting to escape other critical dangers, the chance of making such a mistake is multiplied. Heat sensors in the escape device could warn the firefighter not to take that route and the device could suggest another escape plan.

Another situation is that of a military person 63 or soldier. Many battlefield conditions can affect the choice of a suitable escape route from a dangerous area. Directional sound detectors in a sensor module 64 would be useful in detecting area with friendly or hostile occupants or active use of weapons. Taking these factors into account a computer learning system would be able to estimate an appropriate route for accessing a safer area such as in returning to ones unit. Directions could be displayed in a small display unit using an appropriate sensory mode 65.

A forest firefighter is shown at 66. In this case the protected person is using a water pack to put out a small fire separated from the main area of threat. Heat sensors as part of a sensor package 67 would be useful to detect the approach of active burning and may save a person in danger of being surprised. In particular, continuous planning of an escape route can cause a danger of being cutoff to be detected before the actual threat approaches. Again, a display and warning device is used 68.

A mobility chair or motorized wheelchair is shown at 69. The sensor unit 70 gathers information from servers and sensors. In the event of a threat after a plan is developed appropriate instructions are display on a display 71. In some cases outputs from the escape device are used to direct the chair controls to make the escape or facilitate the needed movements. For example, the chair may have built in limitations of speed and other parameters that can be overridden.

Figure 7:
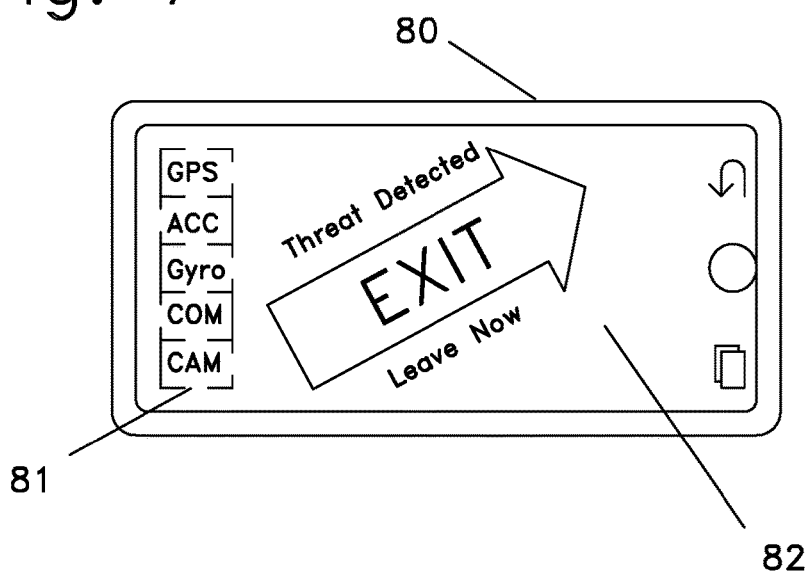

Referring to FIG. 7:

An embodiment of an escape device in a smart phone 80 is shown. Typical smartphones have many relevant sensors 81, substantial processing power and visual, audible and vibratory output devices 82. With suitable software embodying a learning model of venues an escape device can be implemented as an application in a smartphone.

Figure 8:
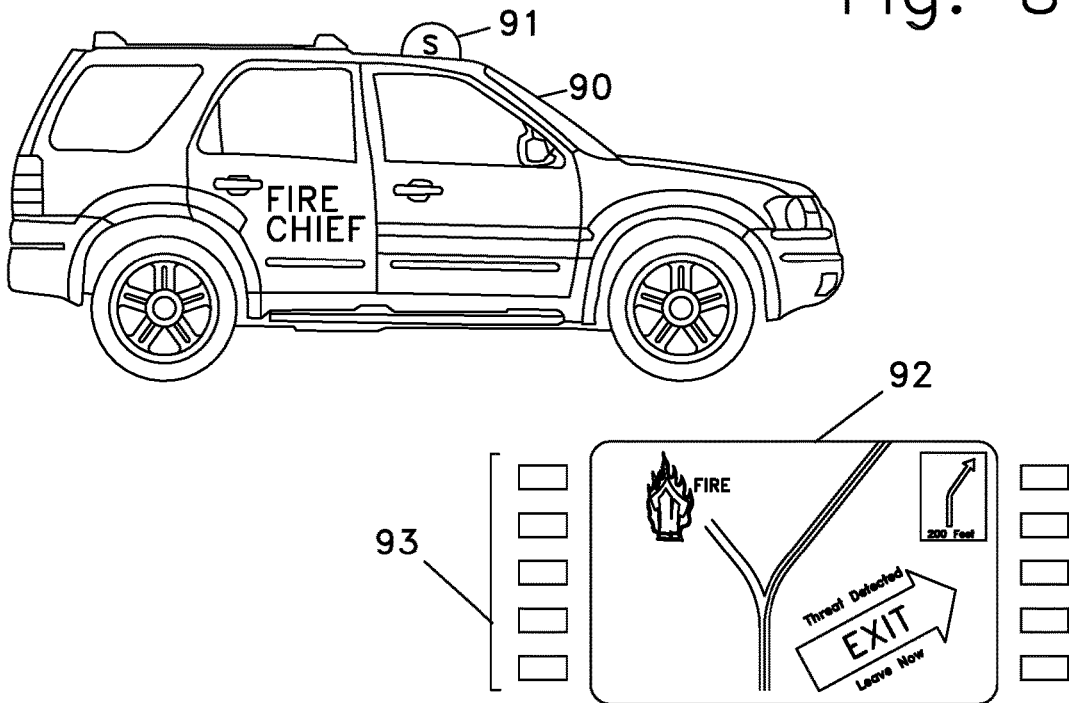

Referring to FIG. 8:

An embodiment of an escape device integrated into a vehicle 90 is shown. The escape device uses a sensor and communications module 91 mounted on top of the vehicle. When a threat is detected the plan developed by the escape device is displayed on the GPS display 92 integrated into the vehicle. The input devices for the vehicle GPS 93 are also used to enter parameters for the escape module. In this way the vehicle user can instruct the escape device about servers and sources of information to be considered.

Figure 9:
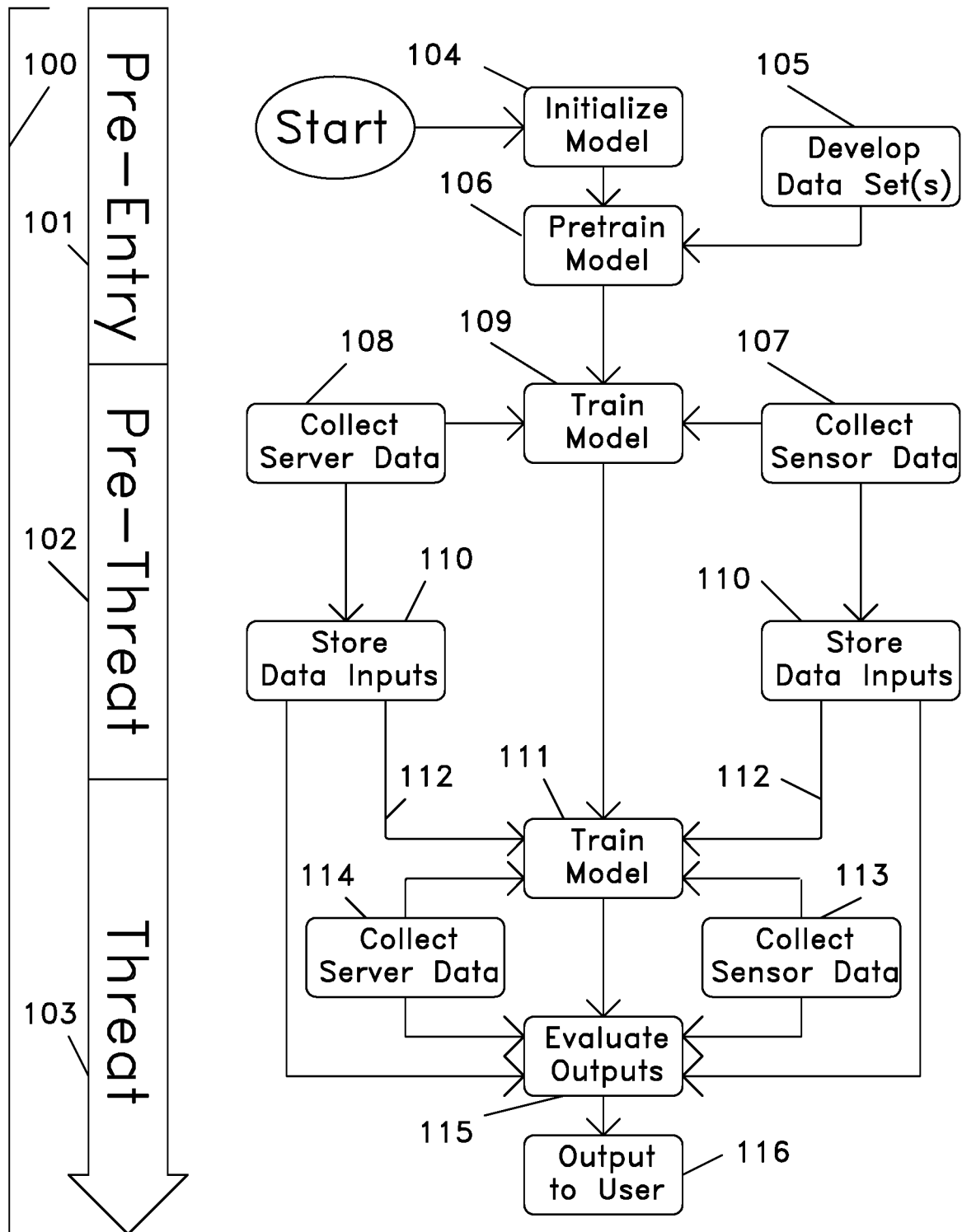

Referring to FIG. 9:

The steps and structure of the basic information flow of the device and its training are shown. There is a timeline 100 which is divided into three periods. First pre-entry 101 which is the time prior to use of the escape device to track entry and movements into a venue. The device is pre-trained during this time. The next time period is pre-threat 102, the time prior to detection of a threat which is used to train the escape device and store relevant conclusions. The final time period is the threat and escape period 103. During this time collection of data and training continue but evaluation of the model and development of escape plans and instructions also occurs. The instructions are put to the output display transducers to allow the protected person to escape the venue.

During the pre-entry period, the model comprised in the escape device is constructed and initialized to parameter values suitable to allow effective training 104. Pre-training 105 typically proceeds in two stages and uses two data sets. The first stage uses a generic data set and trains for general skills such as recognizing objects and edges from a camera sensor. The data set for this stage may not be one specifically developed for this application but is suitable to the sensors and processing resources to be used in the device. The second stage used a data set developed 105 specifically for this application which is based on real or virtual escape and venue analysis scenarios. Such data sets would find data concerning specific venue layouts and facilities and data concerning typical venues that can predict possible situations in actual venues to be especially relevant. The data sets are trained 106, usually sequentially, into the model. Low level training, such as here used, is computation intensive; but it can be accomplished on a one-time basis using substantial computing resources not needed by the final escape device. If the device is produced in mass quantities the pretraining results are loaded into each device in the process of production. Additional data sets and training can be done prior to use of the device to adapt it to specific anticipated uses or venues.

During the pre-threat period, the protected person takes the escape device into the venue. Sensors in the device collect 107 information about the venue and the protected person's location and progress. Information is also downloaded 108 from various servers and beacons provided by the venue or outside sources. The sensor and server information is used to do more venue specific training of the model. This can be accomplished by a processor in the escape device; but it may also be assisted by training resources located in servers away from the escape device. Sensor and server data can also be stored 110 to be used as an input in the later threat stage. The escape device is then readied to receive a threat.

During the threat period, the escape device has been told or has determined that a threat is detected and escape plans and actions should be undertaken. The model continues to be trained 111 from all information sources including stored data 112 and data that continues to be collected from sensors 113 and servers 114. The model is evaluated 115 based on its current training 111, stored data 112, continuing sensor data 113 and continuing server data 114. Outputs to guide the protected person are generated 116 and presented for action.

Figure 10:
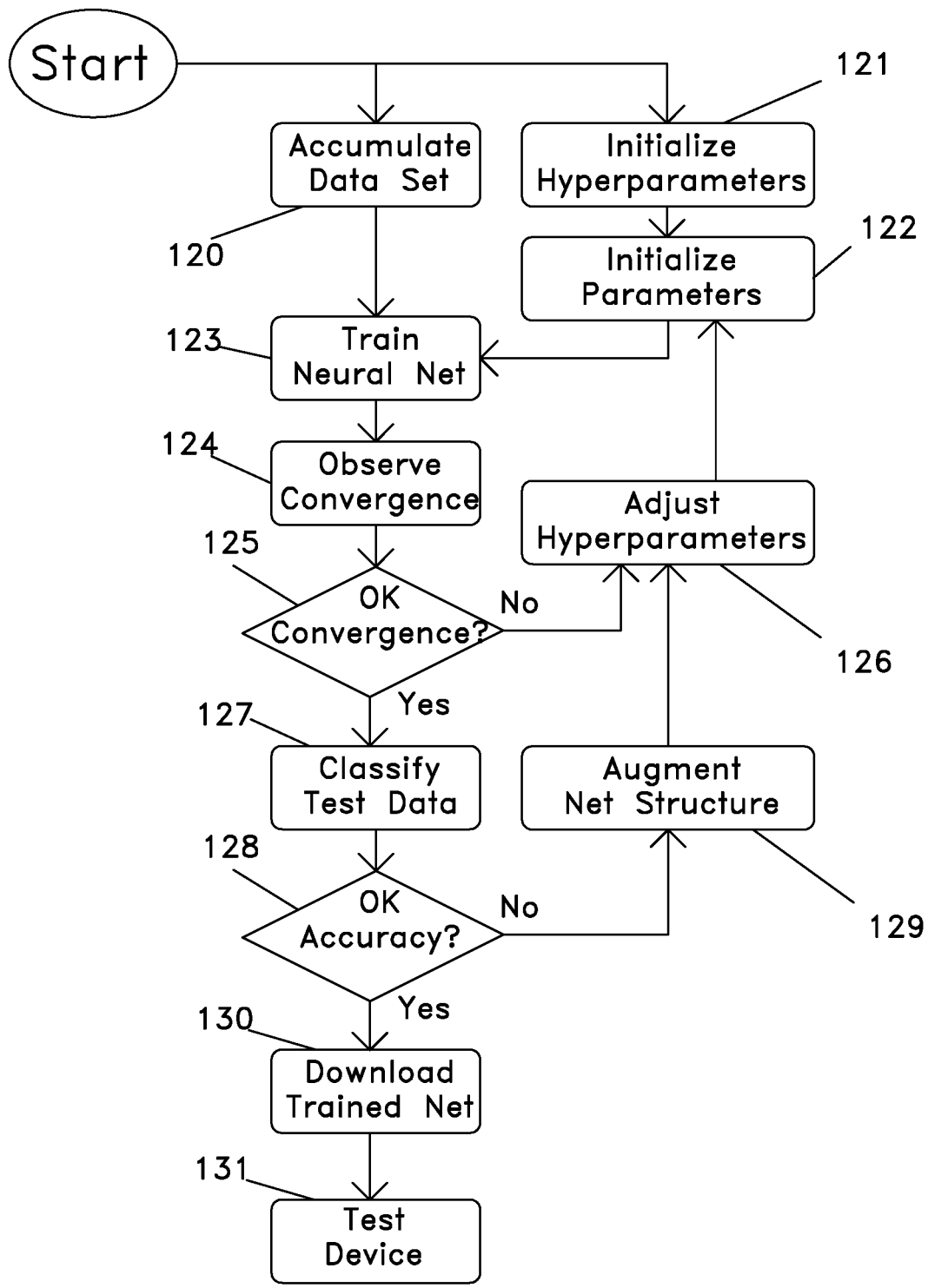

Referring to FIG. 10:

A diagram of the process for developing the pattern matching software for the embodiment of FIG. 9 is shown. The software to be developed is a recurrent neural net with an input layer, a recurrent layer, a additional fully connected hidden layer and an output layer. Other more complex structures are also easily implemented but this structure would be sufficient for the low level of accuracy needed in this embodiment.

The first step of the development is to accumulate 120 a data set for training and testing. Several data sets are required as described for FIG. 9. One set of data is collected by a device that is constructed similarly to that of FIG. 3 and the processor is programmed to collect data from the sensors and transmit it via the communication module to an outside data collection system. A substantial number of escape scenarios enacted or simulated and the resulting data is manually graded and entered into the database.

The data is divided into two sets with a larger portion for training and a smaller portion for accuracy testing. This is considered labeled data because it contains both input (sensor) data and the desired output for that data (presence or absence of transfer).

In this and related embodiments, a step in the development which might be started in parallel with data collection is the design of an appropriate neural network. The sizing of the layers and the setting of various factors in the neural net which are in addition to the factors and values (parameters) that are adjusted in training are collectively referred to as hyperparameters to distinguish them from the "parameters" which are adjusted in training the neural network. The hyperparameters are initialized 121 to appropriate values. In some systems that are taught hyperparameters are adjusted during the course of training but are distinct from trainable parameters because the adjustments are on the basis of the progress of the training rather than being direct functions of the data.

The next step is to initialize 122 the parameters which are to be trained. Appropriate initialization is necessary for reasonably rapid convergence of the neural net. A number of techniques are taught to product an initial set of values which produced good training progress.

The network is then trained 123 by passing data set items through the network as implemented on a training processor. Because training requires larger processing power and time than use of the network after training special powerful processors are used for this step. The training process adjusts the parameters incrementally on the basis of the output of the neural network. The hyperparameters specify the methods of calculating the adjustment to parameters. Generally, the output of the network is used to back propagate through the network to provide further input to the adjustments. The items in the training portion of the dataset are used repeatedly while the convergence of the network is observed 124 by processes in the training data processor.

If the convergence is judged 125 not to be adequate the training is stopped, the hyperparameters are adjusted 126, the neural network is reinitialized and the training process is repeated until satisfactory convergence is obtained. The smaller portion of the data set which has been retained and not used for training is then passed 127 through the neural network (classified) and the output is checked 128 for accuracy. If accuracy is not sufficient for the goals of the particular system being developed then the net structure is made larger 129 and the training process is repeated until satisfactory accuracy is obtained.

The trained neural network is then downloaded 130 to the target device, which is then ready for system testing 131.

Figure 11:
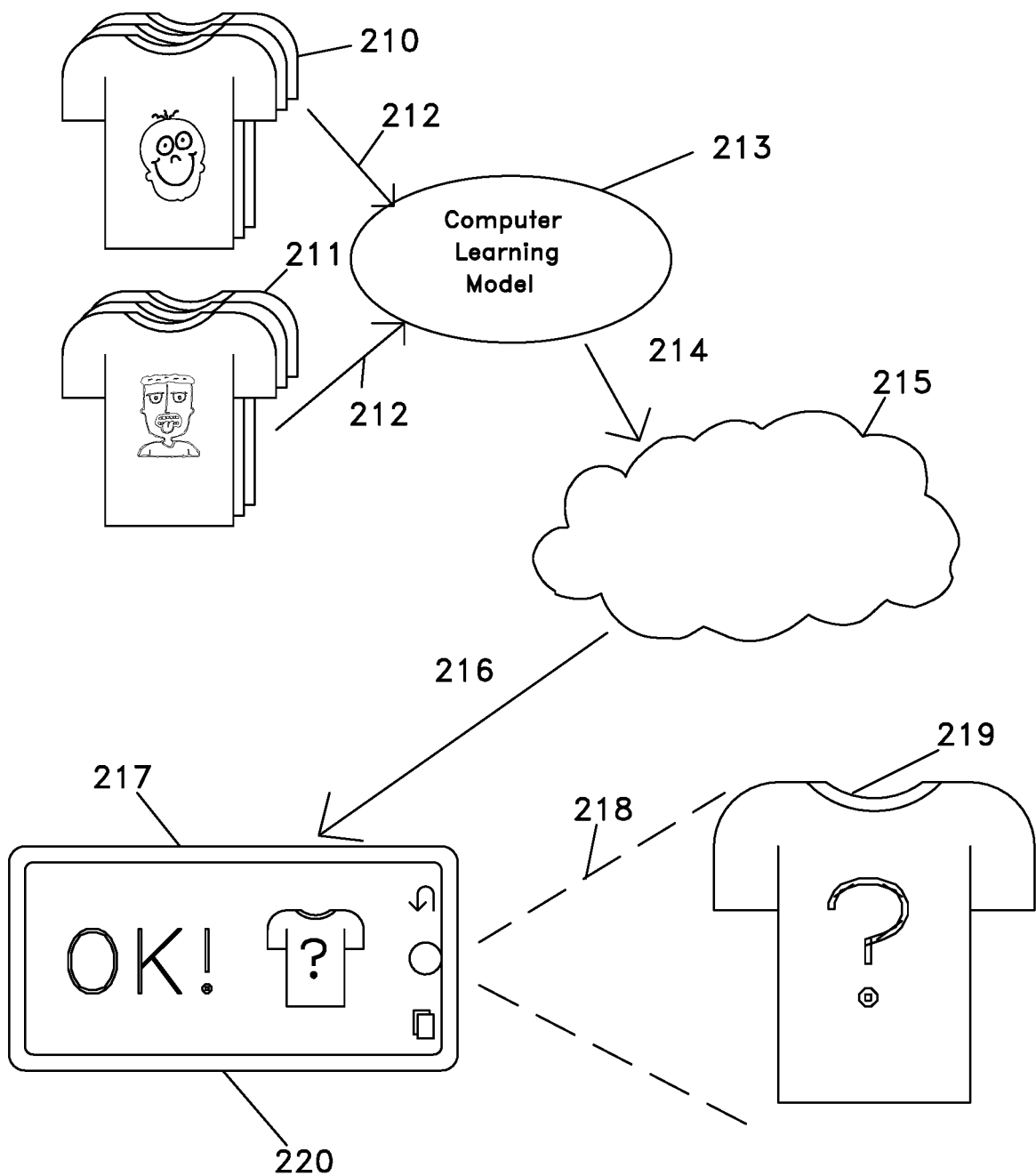

Referring to FIG. 11:

The basic operation of a compliance system is shown. In the depicted embodiment both acceptable 210 and unacceptable 211 images are used to train 212 a computer learning system model 213, which embodies the desired compliance. If the user is a night club venue with a dress code the images concentrate on clothes and other characteristics covered by the dress code. The model is uploaded 214 to a website 215 which is accessed by potential customers of the club. The model is downloaded 216 to an application in the customer's smartphone 217. The application uses the smart phone's camera to view 218 the customer or the customers proposed garments 219. The application has a computer learning module appropriate to apply the downloaded model to the image of the proposed garment and displays a decision 220 concerning the acceptability of the garment.

Figure 12:
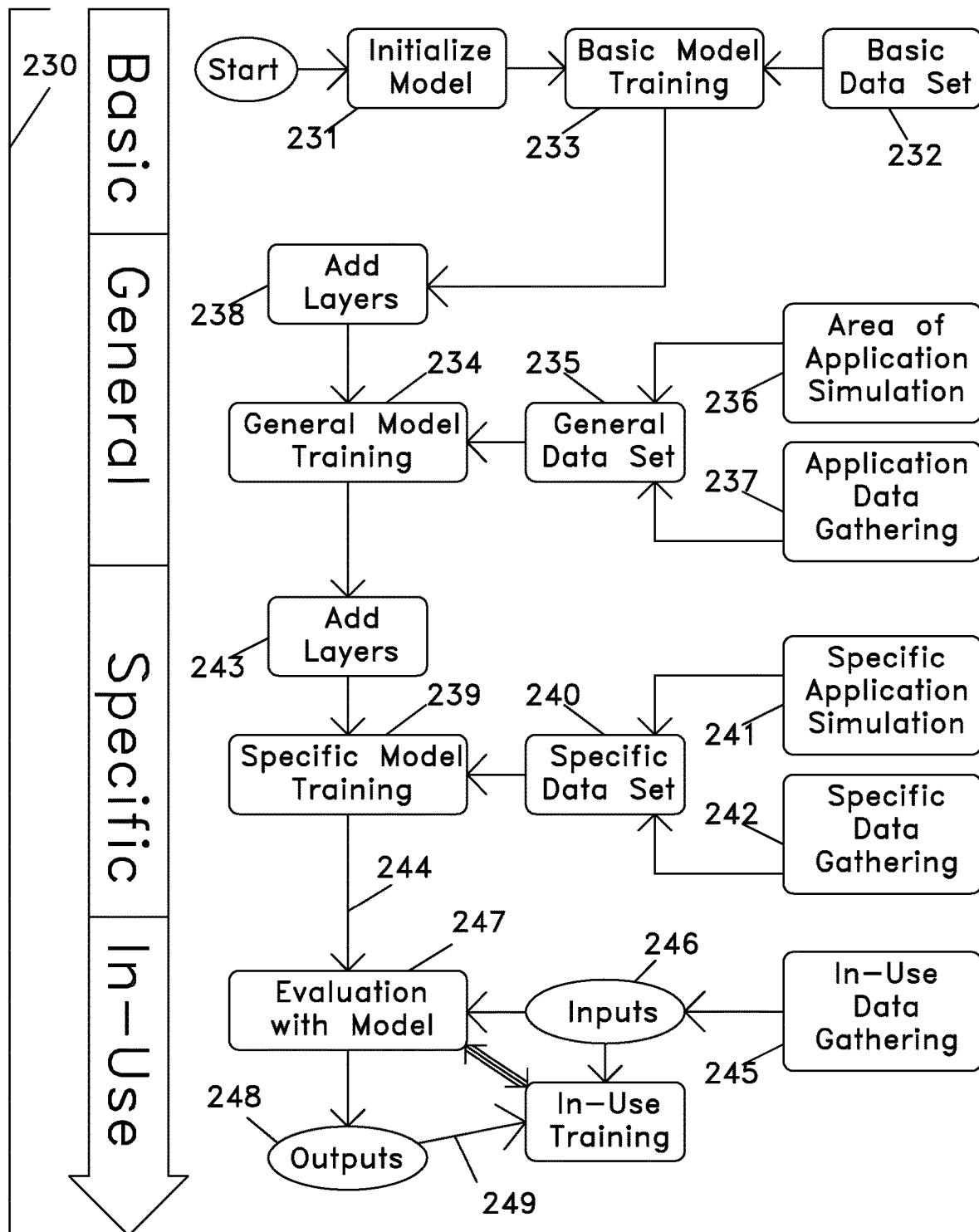

Referring to FIG. 12:

The training and operation steps of the model used to represent rules to be complied with and the situation for compliance is shown. This diagram is intended to show the relationships between different levels of training of a model each of which builds on the levels below. The flow of the training and application of the model are shown by the arrow 230. The main diagram of the figure shows the detailed steps. The description is for a general neural net type of model. Other model types can follow the same general flow and neural nets can incorporate implementation details not shown. The model generally has layers which are arranged in the same order as the training steps and when a particular level of the model is being trained, data is evaluated by the earlier levels of the model which have already had training to provide inputs to the level being trained.

The model is initialized 231 with suitable values in a trainable parameter set. A basic data set 232 with basic information is used to perform the first level of training 233 the model. The model would generally have multiple layers and the basic data set would be used to train the earliest layers of the model. It would use data to allow these layers to recognize or react to features such as edges in pictorial data and sound impulses for audio data. This training would be applicable to many applications of a machine learning system. It may be provided by a supplier of implementation and hardware systems and these layers may be acquired in an already trained condition by implementations of applications. In the embodiment of FIG. 11 showing a dress code standard the first level would be similar to most models and be designed to process data from the kinds of sensors in the device that will finally use the model to evaluate compliance with the standard for the dress code.

The second level of training 234 in the depicted embodiment is done with a second "General" data set 235. This data is selected to allow the model to use inputs to recognize objects and entities relevant to the application of the model. The general data set in the depicted embodiment is generated by a combination of data generation from a simulation 236 of general applications of the model and specific data gathered 237 for such applications. The applications at this level include recognition of objects such as persons, articles of clothing, signs and other items used to define and the movements made by sensors as they traverse a scene. Prior to the training at this level layers are typically added 238 to the model to allow the training to take effect in facilitating analysis with the aid of the moved based on inputs processed by preceding levels of trained model. In the embodiment depicted in FIG. 11 the second level would be able to recognize kinds of clothing, determine the content of text, and find out other factors that would serve to distinguish suitable and non-suitable dress. It would likely be generic for implementation of dress codes in general but would not at this level be using the specific dress code to be enforced.

The third level of training 239 in the depicted embodiment is done with a second "Specific" data set 240. This data is selected to allow the model to use inputs to recognize objects and entities relevant in a context relevant to a particular application of the model. The general data set in the depicted embodiment is generated by a combination of data generation from a simulation 41 of specific applications of the model and specific data gathered 42 for such applications. Typical information used to generate a simulation at this level include many variations of relevant objects for the purpose of applying standards similar to the one to be implemented. Prior to the training at this level layers are typically added 243 to the model to allow the training to take effect in facilitating analysis with the aid of the model based on inputs processed by preceding levels of trained model. In the embodiment of FIG. 11 this level is used to train the model on the specifics of a dress code standard. Pictures of acceptable and non-acceptable dress are used for training to set up to allow the model to predict the acceptability of test sets.

After the model is trained through several levels, it is usually downloaded 244 from high powered training processors which are only used to prepare the model to a smaller portable processor to execute the model in actual use. To use the model to evaluate a situation data is gathered from the situation 245 by means of appropriate sensors and prepared to serve as an input 246 for the model. The model on the basis of (evaluating) the inputs generates 247 outputs 248 corresponding to the action of the training on the parameters of the model.

In some more advanced implementations of the system, inputs and outputs are used to select 249 additional training for the model. The information in the inputs and outputs can cause the download of sets of parameters which can be added to the model or a limited training process similar to that used to develop the original model can be accomplished by the evaluation processor.

Figure 13:
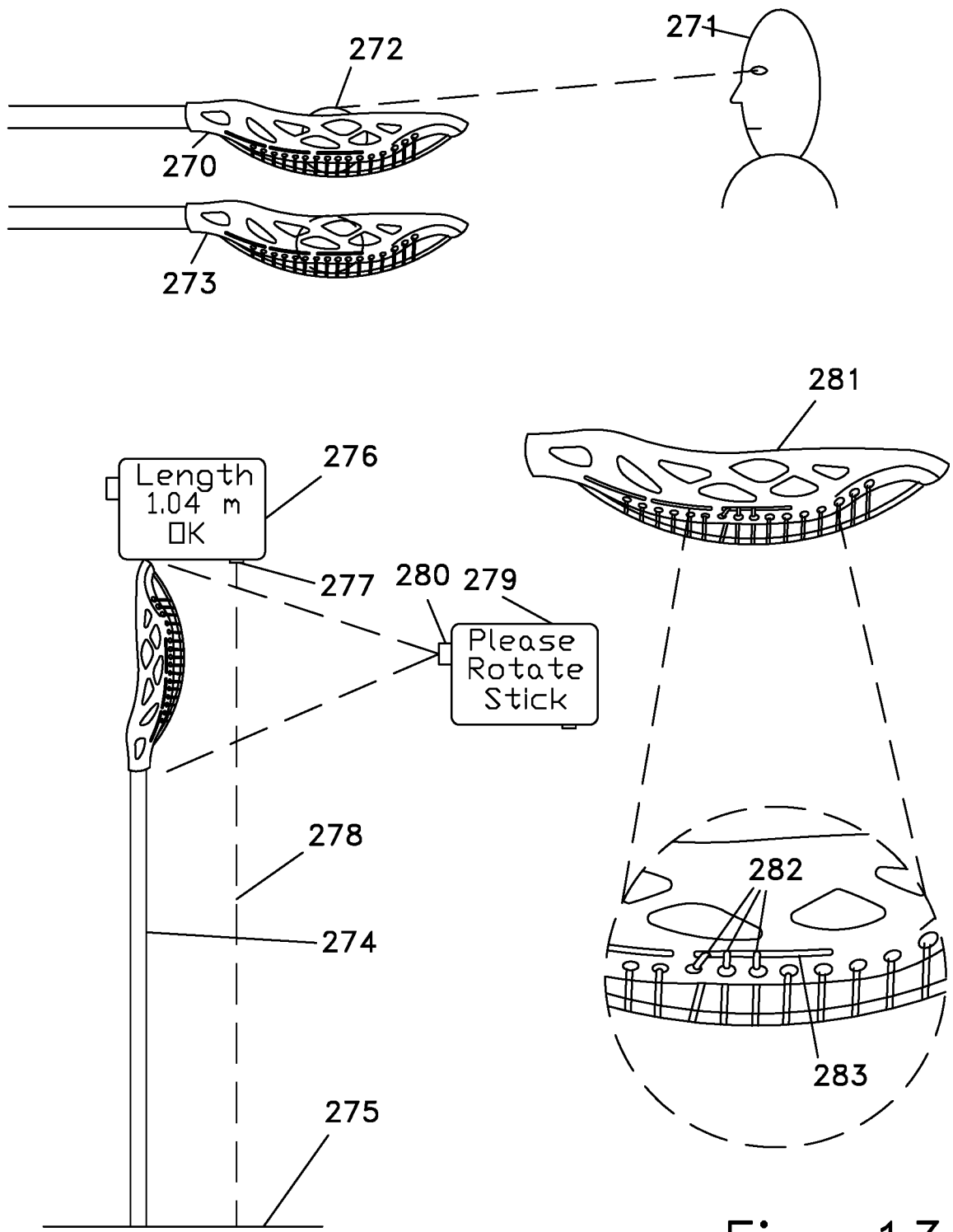

Referring to FIG. 13:

FIG. 13 shows an embodiment where a machine learning compliance system is used to check women's lacrosse sticks for legality. The usual way that female lacrosse players take the ball from opponents is to dislodge the ball by striking the opponents stick with their own stick. A stick with a pocket that held the ball too tightly would be an unfair advantage. A complex system of rules for lacrosse sticks has grown up to prevent this. The particular existing rules used to illustrate this problem her are those published by the Federation of International Lacrosse, Women's Sector. During games the officials perform inspections of sticks which usually only check if the pocket has been made too deep by failing the expose the ball above the siderail of the stick. The particular rule is "The top of the ball, when dropped into the pocket of a horizontally held crossed, must be visible/seen above the top of the entire wooden or plastic sidewall after reasonable force with one hand has been applied to and released from a ball." This rule is fairly objective and can be reasonably applied by an official on the field, but there are many other rules which require judgement, measurement with instruments, and detailed interpretation to apply. In practice, the enforcement of these rules is by a system of approval of samples of new models of lacrosse sticks submitted by manufacturers. The approval system greatly slows adoption of new models and does not address variation after manufacture from wear, repair, user stringing adjustment, user modifications and outright cheating.

A device with a downloaded machine learning model and sensors can perform a much more thorough check of a lacrosse stick and provide confidence that the rules are being observed.

Referring again to said FIG. 13, a lacrosse stick 270 is shown being checked by an official 271 without the help of any device. The official observes that the ball 272 placed into the pocket extends higher than the sidewall of the stick's head. This stick passes the inspection. Another stick 273 is shown with a ball that does not extend over the sidewall and is declared illegal. This is usually the only check currently done, but an official may or may not observe other violations and will declare other faults in a potentially inconsistent manner.

A lacrosse stick 274 is shown with its handle end placed on a flat surface 275 and with a device 276 containing a sensor 277 placed on the head of the stick. A beam 278 from the sensor, which could be light, infrared, sonic or radio in nature depending on the choice of sensor, is projected to the flat surface and the length of the stick is measured from the reflection. The length determined by this process is used as one input to the machine learning model implemented in the device. By well know principles in the field of machine vision, various other dimensions of the object can be determined from use of a camera 280 or video sensor in a device 279, which may be the same device used to measure the length. These additional measurements are used as additional inputs to the machine learning model. The case depicted the vision enabled device is requesting that the lacrosse stick be rotated to provide additional angles for visual inspection. There are several measurement based rules such as the requirement that the overall length of the head be between 25.4 cm and 30.5 cm.

There are many rules that could be enforced by a machine learning system other than the linear measurements above. An additional example is shown in the laced lacrosse stick head 281 shown with three of its laces 282 run through a slot 283 above the lacing holes. This is in violation of a rule concerning attachment of a pocket to the head which requires attachment to the bottom of the bottom rail. This rule is reasonable because the variation in attachment heights of laces could provide a trapping effect for the ball which would be an unfair advantage. The rule as stated in the rulebook is complex and requires pictures to guide the officials. Violations in practice could be easily overlooked and an automated system would be helpful in preventing them.

Figure 14:
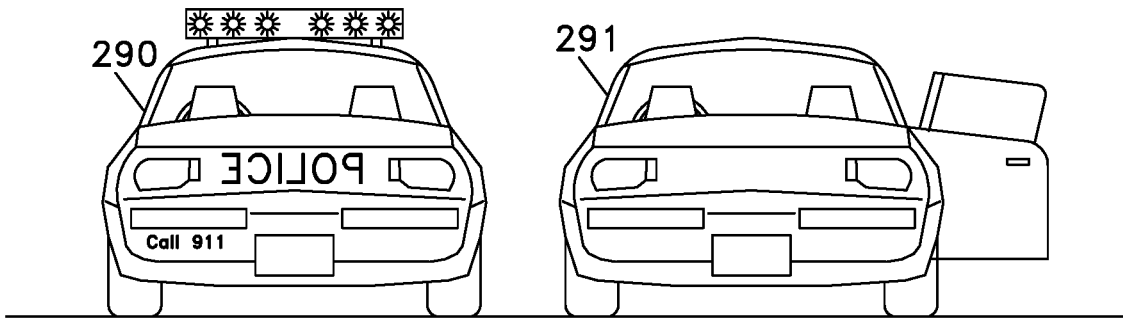
Figure 15:
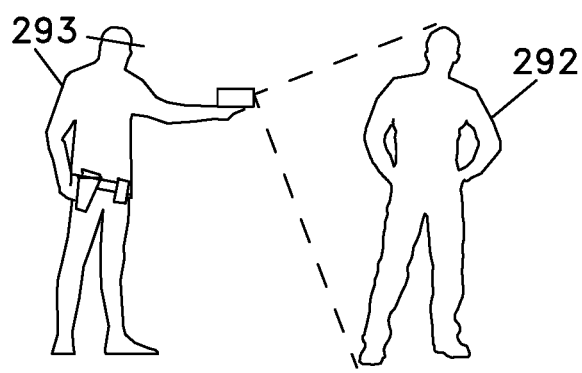
Figure 16:
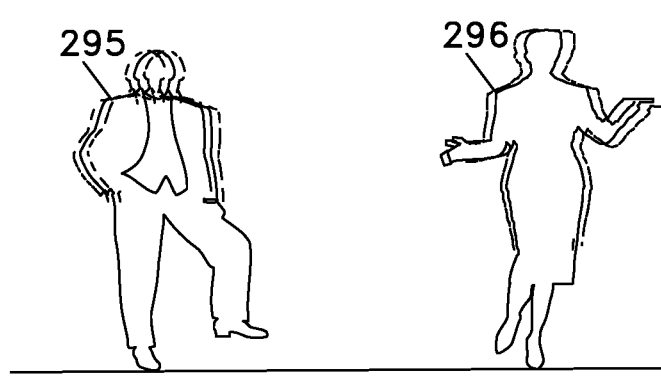

Referring to FIGS. 14 to 16:

Law enforcement officers are often required to make judgements when motorists suspected of driving under the influence of alcohol or other intoxicating substances. Chemical tests for alcohol levels are intrusive and in some places can only be required on the basis of a specific level of suspicion which may later be overturned in court. A non intrusive method of screening would be useful in eliminating the need for chemical tests in some cases and in justifying the requirement in other cases. A device with an appropriately trained machine learning model which video and audio information taken or recorded can provided this function.

FIG. 14 shows a police vehicle 290 which has stopped a vehicle 291 with a driver suspected of impaired driving. The driver 292 has left the car and in FIG. 15 and an officer 293 is collecting information about the driver with video and audio sensors in a device 294. The device does appropriate preprocessing of the information and supplies it as input to a machine learning model trained for this use. The device informs the officer with outputs signifying the probability that the driver is in fact impaired and the officer decide whether to do additional testing. The testing may consist of further data collection with the device or may require other types of testing. FIG. 16 shows two drivers which have been asked to stand on one foot as a test of their state. The device analyses their motions. Each driver is wobbling, but both sober and impaired drivers may wobble in this situation. The first driver 295 has his hands in his pockets which may contribute to the wobble. This driver is showing irritation with being stopped which may contribute to a lack of effort to stand steadily and may affect the impartiality of the officers judgement if evaluation is not made with an objective system. The second driver 296 is attempting to appear sober and pass the test and trying hard to stand in a steady manner. When the system is trained on a wide variety of potential persons and situations all of these factors will affect the trained behavior of the model.

An important reason to use an objective model is to prevent both the fact and appearance of unfairly judging persons with medical conditions that may appear falsely to some officers as evidence of impairment. Such errors can cause extreme embarrassment to law enforcement agencies. This can be prevented by using a large number of examples of persons with such conditions in training the system. The training should be objective in the sense of using training data with actual chemical or other objective test results. In this way, errors involving confusion of balance or speech impediments with effects of substance abuse can be reduced to very small levels.

Figure 17:
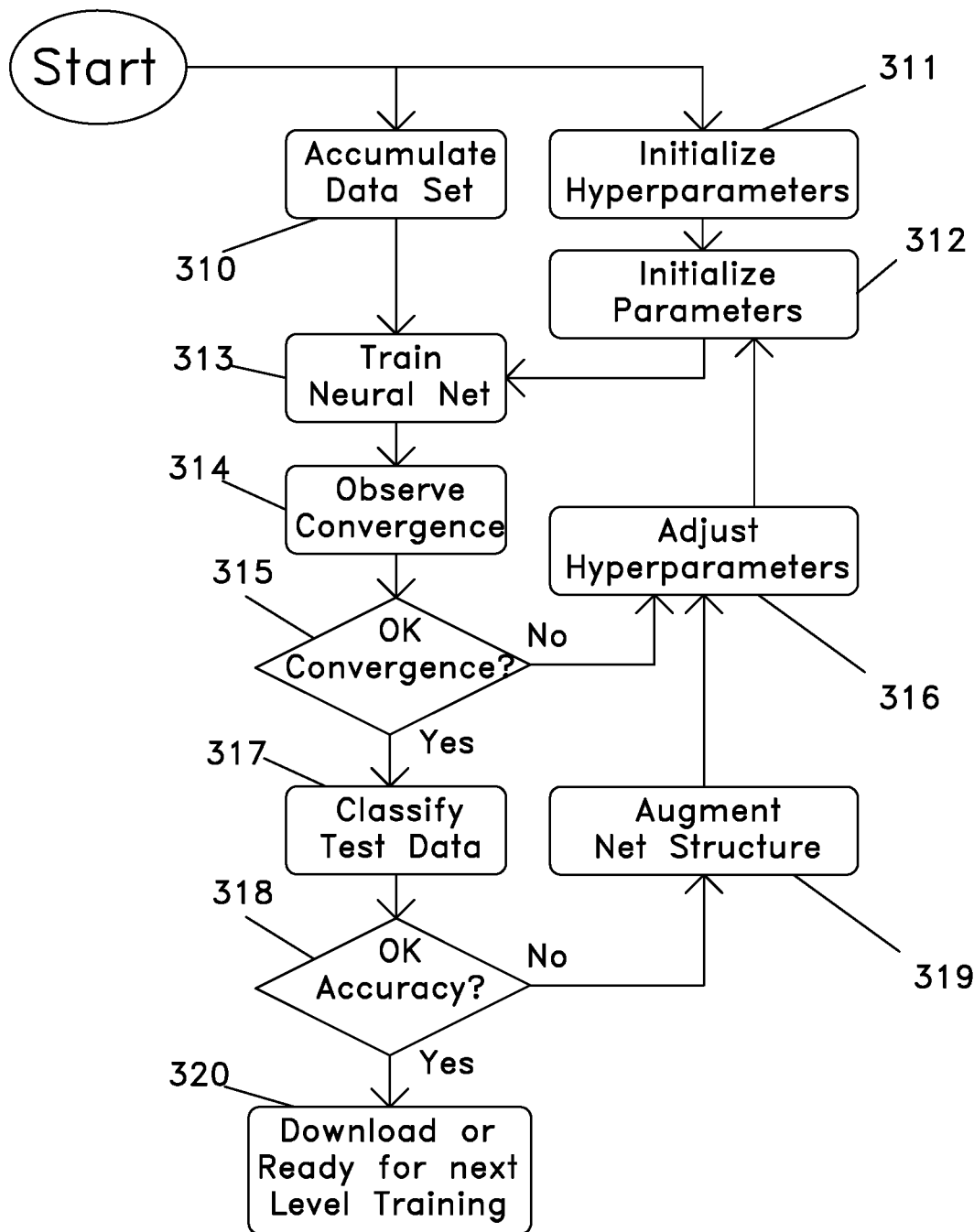

Referring to FIG. 17:

A diagram of the process for developing the pattern matching software for a typical embodiment of a machine learning system is shown. The software to be developed is a recurrent neural net with an input layer, a recurrent layer, an additional fully connected hidden layer and an output layer. Other more complex structures are also easily implemented but this structure would be sufficient for the low level of accuracy needed in many embodiments. This figure shows training in one level and the steps would be repeated when training is accomplished in multiple levels. An example of multiple level training is shown in FIG. 12 which has basic, general and specific levels of training prior to download to the second platform for use and an "in-use" level after download. Thus, the system of FIG. 12 would use the steps of this figure up to four times. Certain steps, such as checks for convergence, may be omitted for certain levels.

The first step of the development at each level is to accumulate 310 a data set for training and testing. A device constructed similar to device for use of the system can be used to collect data that matches in its use of sensors and preprocessing but the processor is programmed to collect data from the sensors (such as item 280 of FIG. 13) and transmit it via the communication module to an outside data collection system. A dataset for the basic level of training (see 230 of FIG. 12) would typically consist of data to teach components of sensor inputs such as identifying edges in picture data and separating different sound sources. A dataset for the general level of training would train a model to recognize particular events and objects such as persons, clothing or the head of a lacrosse stick. A data set for the specific level would teach cases which distinguish between complying and non-complying situations. The data is usually divided into two sets with a larger portion for training and a smaller portion for accuracy testing. This is considered labeled data because it contains both input (sensor) data and the desired output for that data.

In this and related embodiments, a step in the development which might be started in parallel with data collection is the design of an appropriate neural network. The sizing of the layers, the pattern of interconnection between layers and between gates within layers (such as the addition of recurrency), and the setting of various factors in the neural net which are in addition to the factors and values (parameters) that are adjusted in training are collectively referred to as hyperparameters to distinguish them from the "parameters" which are adjusted in training the neural network. The hyperparameters are initialized 311 to appropriate values. In some systems that are taught hyperparameters are adjusted during the course of training but are distinct from trainable parameters because the adjustments are on the basis of the progress of the training rather than being direct functions of the data.

The next step is to initialize 312 the parameters which are to be trained. Appropriate initialization is necessary for reasonably rapid convergence of the neural net. A number of techniques are widely known to produce an initial set of values which generate good training progress toward convergence.

The network is then trained 313 by passing data set items through the network as implemented on a training processor. Because training requires larger processing power and time than use of the network after training special powerful processors are used for this step. The training process adjusts the parameters incrementally on the basis of the output of the neural network. The hyperparameters specify the methods of calculating the adjustment to parameters. Generally, the output of the network is used to back propagate through the network to provide further input to the adjustments. The items in the training portion of the dataset are used repeatedly while the convergence of the network is observed 314 by processes in the training data processor.

If the convergence is judged 315 not to be adequate the training is stopped, the hyperparameters are adjusted 316, the neural network is reinitialized and the training process is repeated until satisfactory convergence is obtained. The smaller portion of the data set which has been retained and not used for training is then passed 317 through the neural network (classified) and the output is checked 318 for accuracy. If accuracy is not sufficient for the goals of the particular system being developed then the net structure is made larger 319 and the training process is repeated until satisfactory accuracy is obtained.

The trained neural network is then downloaded 320 to the target device or made ready for next level of training.

(End Material from Parent and Grandparent Applications)

Detailed Description for the Current Application

Granularity

Coarse and Fine Granularity

Cameras, Microphones and other sensors produce signals which sample the measured conditions at various resolutions over several different dimensions. A camera can sample at a variety of pixel resolutions. A microphone or other sound sensor can take measurements at various sampling rates. The reduction in sampling rates from the maximum rate in space, time or some other dimension is called herein a reduction in granularity. That is, this specification uses the definition of granularity with the convention common in the field of investing more granularity indicates fine granularity and rejects the definition used in photography where more granularity indicates coarse granularity.

Dimensions of Granularity

There are many different dimensions or axes which can have varied levels of granularity. They include:

Pixel count of an image in either a single dimension or in multiple dimensions. Even with a single sensor the sensitivity to low light can be increased by combining sensor pixels to form a larger more sensitive virtual pixel. This coarse granularity allows savings in energy for processing and for illumination.

Sampling rate for a sensor. In the case of audio sensor signals, this means that for coarser granularity samples are taken at greater intervals. It is also possible to take bursts of samples with two rates the burst rate and the sample rate within a burst. For example, a burst of 100 samples at 20,000 samples per second could be taken 10 times a second. The coarser granularity could be on either the burst rate or the sample rate.

Even if the samples are taken at the same granularity, the granularity can be reduced in processing by using simpler approximate algorithm to do processing. This can be lossless or lossy.

Substitution of a sensor of finer granularity for a coarse sensor. The finer sensor may work in a different mode than the coarse sensor. For example acoustic sensors may be used to detect conditions for use of active illumination sensors working in radio or optical electromagnetic modes.

Data Size and Granularity

If the same area or time interval of observation is used and different levels of granularity, then the quantity of resulting data would be larger at the finer granularity. In some cases, the fine granularity observation is made over a smaller area or time interval and the data size remains the same. There may still be a saving of resources at coarse granularity because of factors other than the number of samples taken by a sensor.

Illumination and Granularity

Active illumination in any mode including light, radio or acoustic can result in finer effective granularity. If the received returned radiation or sound is increased is a possibility of increased depth in sampling. The effective granularity becomes finer and insignificant digits can become significant. Variation of illumination can consist of either using it only at finer granularity or by varying it's intensity at different modes. The type of sensors and even the general mode of observation can change. For example, acoustic sensors can be used for continuous monitoring and be augmented with light based imaging when a machine learning model indicates the desirability of such.

In the case of observation by visible, infrared or other light the granularity can become finer in multiple ways. The use of an image sensor multiple pixels with greater illumination can be can work at various resolutions determined by the available light level. This is because the sensitivity can be increased by combining the operation of multiple adjacent pixels into a single larger pixel. This is the principle of operation of low light modes on many current consumer cameras. Another way to increase the light sensitivity of a light image sensor is to take a longer sampling time resulting in a coarser granularity in time. If an image sensor works at a low light level the amplification of the sensor can be increased and a sample can be obtained, but the noise will also be increased and the depth of the sample is reduced. That is, a sensor than can produce an 8 bit range of depth may only produce 4 bits of depth in low illumination. Thus, there are at least three dimensions where reduced illumination can be used, pixel size or combination, sampling frequency, and sampling depth.

Illumination in Other Modes

Illumination can be in other modes than with electromagnetic radiation. For example, the illumination may be with sonic pulses for systems that use active sonar. If illumination is with radio frequency energy (radar) then low level illumination can be used for coarse granularity and more intense illumination can be used to refine the granularity.

Changing Mode to Improve Granularity

In many embodiments the same sensor system or sensor system that works in the same mode is used for both coarse and fine granularity observation. In some embodiments the sensor systems and mode of operation for different levels of granularity can be completely different and work in different modes. For example, the coarse granularity system may be a sonic system that detects movement and the approximate area of the movement and the fine granularity system may be a high resolution camera with visible or infrared lighting.

Resources to be Conserved

Energy Consumption for Illumination.

One of the most important areas for conserving resources is to control the level of illumination provided. In a coarse granularity low level, natural or existing illumination may be sufficient to allow the required observation. The illumination may be any form of energy including infrared, visible or ultraviolet light; sonic energy; radar or radio frequency illumination; radiation; particle beams or some other form. The illumination itself or the energy to provide illumination may be the conservable resource.

Energy Consumption for Operation of Sensor

Many sensors themselves require energy for operation. This often varies with the granularity of the sensor. There can be a substitution of a finer sensor with more resource use or the sensor itself may allow various modes with a tradeoff of granularity and energy use. Simple video sensors for cameras usually vary in the energy consumption with variations in both the frame rate and in the pixel density. Some consumer cameras are limited in the time they can operate at fine granularity by heating of the sensor and the related energy use. This can also be reflected in battery life. High resolution video cameras are sometimes limited in the length of time that they can work at high resolutions and frame rates (fine granularity in time and pixel domains) by the heat that energy consumption produces. Cooling requirements are a related resource that may need restriction on the operational granularity for conservation.

Energy Consumption or Other Resource Use in Transmission of Sensor Data for Processing Elsewhere.

Many sensors especial video sensor produce large amounts of raw data. If the data is to be processed by processors remote from the sensor, this data must be transmitted to the processor. This may be difficult in many situation. One notable example is the data collected by probes in the far reaches of space at the edge of the solar system. The transmission itself can be the bottleneck in such systems.

Sensor, Illuminator or Other System Component Service Life.

Limitations on hours of use may be the limiting factor in many systems. A familiar example is that ordinary incandescent light bulbs burn out after a number of hours. Not turning illumination or other systems on until preliminary low granularity data indicates the need can reduce this problem.

Sensor Data Processing Processor Work.

Raw data from sensors can require substantial processing for use. Much of that processing is scaled to the granularity. Each pixel or sample can require individual processing. In other cases the amount of processing can be much more than linear in its dependence on sample density the square, cube or higher power of the number of samples or even in an exponential relationship.

Possibility of Detection of System by Adversarial Persons.

Operation of a system in fine granularity mode may require that the system expose itself to adversarial persons. For example, turning on radar or light illumination may announce presence. This may in turn require expenditure of resources to defend the system. If a vehicle is involved it may have to speed up or promptly leave the are consuming more fuel. Additional jamming energy may also be required.

Avoidance of Disturbance of Persons, Animals or Systems by Illumination or Use of the Sensor System.

Fine Granularity Data May Require the Acquisition or Importation of Comparison Data with Corresponding Resource Use.

Tradeoff Between Granularity and Resource Use.

Taking observations at finer granularity can result in production of information that is of many uses. These include: identification of type of an object observed, greater precision in location of objects, determination of speed or movement of objects detection of additional objects, observation at greater range, opportunity for further machine learning model analysis to determine details, and interactive information interchange with the observed object.

Sensors

Sensor Types

Use of different types of sensors can greatly vary the required resources. For example, acoustic or vibration sensors may require much less power than optical imaging sensors, especially if active illumination is needed.

Description of Figures from the Current Application

FIG. 18

FIG. 18 depicts an embodiment which uses a video camera 410 to observe in a remote area. The camera is mounted on a pole 411 and is powered by a small solar panel 412. There are lights 413, which could be continuous or have momentary flashing. The lights illuminate a target 414 to be observed or analyzed by the camera. In the particular version of the embodiment which is depicted the target is a bird which may be part of a flock which could be a hazard to aircraft. The camera is set up in the outskirts of an airport and is to allow aircraft to be warned to prevent bird strike damage. The space between camera's is large in this installation and use of the illumination requires substantial resources. The illumination is therefore only used to do specific identification of the species of the birds as one that are a threat. The unilluminated use at coarser granularity is used to determine when to turn on the lights for a closer look. It is well known that combining pixels in a camera sensor can allow use in greatly reduced illumination.

FIG. 19

FIG. 19 shows the field of the camera in the high resolution (fine granularity) mode 420 and in the low resolution (coarse granularity) mode 421 which allows use at low illumination levels. In the fine granularity case the details 422 picked up allow identification of critical details in determining the meaning of an observed object. In this case it allows determination if a bird is of a species that produced a bird strike threat to aircraft. The coarse granularity unilluminated image shows 4 activated pixels only 423 and is to be analyzed by the machine learning model to determine if they signify a possible bird which would require expenditure of the energy to provide illumination for use of the fine granularity mode for further examination.

FIG. 20

FIG. 20 shows a channel 430 in a waterway with a surface 431 and a sonar system 432 to monitor vessels passing through the channel. The sonar system listens passively to sounds 433 indicating passing objects such as a submarine 434 or a whale 435. Application on an appropriate trained machine learning model to the received sounds can indicate with coarse granularity the nature of the object making the sounds. The system may be able to distinguish the approximate direction from which the sounds are coming. In some cases, here the submarine, there is a determination that a fine granularity analysis of the situation is warranted and sonic illumination 436 is turned on and the passive sonar is used in an active mode to determine the exact nature, location and other properties of the object. The passive use conserves many potentially important things. It conserves energy, prevents interference with other systems, reduces the information given to potentially adversarial persons and reduces interference with marine wildlife. It may be forbidden to use active sonar in the vicinity of marine mammals and passive distinction between a vessel and a whale may be necessary before turning on sonic illumination.

FIG. 21

FIG. 21 shows a pair of directional multiple microphone systems 440 in a warehouse. It consists of an array of shotgun microphones such as 441 each of which has a limited width of sensitivity. The two crossing beams 442 produce a location with a coarse granularity proportional to width of the beams in each dimension. In the depicted case the stacked material in the warehouse 443 causes reflection of the sounds and substantial processing by means of a trained machine learning model is required to produce the best estimate of the source of a detected sound. Once the estimate is available a particular optical camera 444 is selected, turned on and aimed at the estimated position. A search may ensue and the source identified. Fine granularity in the optical system may be required for purposes such as identifying a person 445 as a warehouse employee rather than a intruder.

FIG. 22

FIG. 22 shows a system with three steps of granularity and training of a computer learning model from data gained in the first step to aid the analysis of the second step in triggering operation of the third step. An area of terrain 460 is shown with objects of three kinds 461, 462 and 463. The object 463 is of interest for the detailed examination of the third step. The first two steps are done by a unmanned aerial vehicle (UAV) 464 which overflys at an higher altitude 465 for the first step and makes observations 466. The data gathered is analyzed with the use of a machine learning model trained in advance in the levels necessary for this purpose. This analysis enables either the same or another UAV to make low altitude flights 467 over as yet unclassified objects such as 468 and with the aid of another machine learning model classifies the objects with the aid of the finer granularity observations 469.

This step requires greater use of resources such as flight time and fuel because of the necessity to approach each object for close finer granularity observation rather than the bulk observation in the first step.

In the third step a manned aircraft 470 examines 471 each object selected in the second step with a sophisticated observation sensor with finer granularity than in the earlier steps. Only the objects identified as being of the interesting kind such as 468 are examined by this very resource intensive method.

FIG. 23

FIG. 23 is a diagram of the functional steps of the system of FIG. 22. The operation starts 480 and as a first step observes 481 the terrain at a high altitude with corresponding coarse granularity. A small number of passes is required because a wide area is observed from the distance and because of the limited number of passes a small use of resources is required. The data is analyzed 482 with a pretrained machine learning model. In the depicted case, the locations of objects on terrain is determined but from the distant course granularity observation the objects cannot yet be classified by their type. A list of locations from which the UAV to make close approach finer granularity observations is produced by the analysis. On the basis of this list additional observations are made 484. These observations use additional fuel and vehicle time because they are made object by object instead of covering a larger area containing multiple objects. A second stage of analysis 485 with another pretrained machine learning model 486 yields a list of locations for the final observations 487 at very fine granularity 488 to be made with another system using at the expense of even greater resources.

FIG. 24

FIG. 24 is a diagram of a more complex set of functional steps using the objects and system of FIG. 22 with additional training of the machine model from data gathered by earlier observations. The operation starts 490 and the UAV observes 491 a wide area of terrain at course granularity. The observations are analyzed 492 with a pretrained machine learning model 493 producing both a list for the next observations and data 494 for training a second machine learning model. The 2nd model is trained 495 and the observations at finer granularity 496 are performed. The trained model 497 is used to perform an analysis 498 on the observations which results in production of a list of interesting objects which is used to guide the very fine granularity and high resource use observations 499 of the piloted craft producing 500 very fine granularity data concerning the interesting objects.

FIGS. 25 to 28 are described in the section on machine learning.

FIG. 29

FIG. 29 describes an embodiment where anti-surveillance devices are used to detect an adversary device planted in an environment. The device 700, here called a 'bug' is concealed and transmits intercepted room sounds using sophisticated techniques to avoid detection. It uses techniques such as operation below the noise, frequency hopping, burst transmission and emulation of background noise to avoid detection. Several antennae 701 in a room 702 gather signals in a broadband way and convey the signals to a processor 703 which looks for signs that a bug may be present. This search is limited to the local signal processing power of processor 702 and is low granularity with respect to any particular adversarial concealment scheme. Thus it may fail to detect the bug.

However, the processor is applying a machine learning model to look for signs of a bug. After the pre-training accomplished prior to use on large scale training processors, the model has been trained on processor 703 in the specific environment with various testing bug simulators. In particular, it has learned to detect signals from the correlation of signal delays between combinations of direct and reflected paths 704 particular to the layout of the protected space. This enables detection in some cases which are otherwise undetected. If the model on processor 703 detects probability of a bug, it may be limited in the ability to analyze the signals to confirm its detection, but can cause a larger processor system 705 located at a remote site which service many detection devices to begin analysis of a larger sample of the signal to confirm the detection and to derive further information about the bug such as its exact location in the room and the types and content of the signals produced by the bug.

FIG. 30

FIG. 30 is a diagram of the operation and development and operation of the system of FIG. 29. A machine learning model is generated and pretrained 710 to identify potential signals from bugs. The model is downloaded 711 to the local processor 703 (FIG. 29) which receives signals from antennae 701 (FIG. 29). The local processor also gathers data 712 from simulated bugs using the same antenna in the same layout as in actual use. The model is then field trained 713 from the local data.

The surveillance system composed of processor 703, antennae 701 and the trained machine learning model is not placed in operation and scans for bugs 714 with its course granularity capabilities and resource use and deciding 715 if a bug is suspected. If so then a larger processor 704 is notified 716 and begins to take fine granularity, large volume data from the antennae. In a typical case, the local processor relays the data to the larger processor which is off site. The local processor would then have sufficient data handling capabilities but not sufficient processing capabilities for fine granularity analysis. The larger processor handles the fine granularity data and uses a larger more detailed machine learning model with auxiliary signal processing using specialized hardware the analyze the signals to locate and classify the potential bug. It accepts data from multiple antennae over a wide signal bus 720 from the local processor.

Description of Machine Learning, Models and Training

A device to use gathered information to solve problems such as guiding a person from a venue where a serious hazard exists requires very sophisticated computer system to complex problems in interpreting incoming data and generating a plan for escape. In general, it is not feasible to discover all of the rules and relationships necessary to solve that problem and to write a determinative computer program that produces a sufficient result. However, methods have been developed and are wide and increasing to use a set of examples which is processed and used to product a set of rules which working together can find answers suggested by the examples. A substantial set of examples and a large amount of processing are required but many people are trained and are being trained in application of well-known methods to implement this approach on a wide variety of problems.

There are limitations on the kind of problems that can be solved with this approach, but the problem here is well suited for the approach because of the specific input data that is to be gathered and because of the specific kind of output that is required.

Machine learning as used here and in the Claims is a term for the type of artificial intelligence that is implemented without explicit programming to generate solutions to the problems confronted. It is focused on the development of solutions by having the effective program change as it incorporates data in such a way that it converges on an ability to produce the required solution.

Model

The term model as used in this specification includes representations that do not explicitly describe the system modeled but which are designed or trained to produce information based on the behavior of the system. It includes pattern matching system such as a neural network which has been trained on data exemplifying the system. In that case the model consists of a, probably huge, array of parameters that determine the operation of the individual neurons in the neural net program. Training would work by systematically adjusting the values of these parameters on the basis of the training data.

Machine Learning

Machine learning is a well-developed and understood method of creating devices that are capable of solving problems that defy development of programmatic solutions that rely on understanding in detail the working of the system to be analyzed. A famous example is the modern language translation systems widely used on personal computing devices. Development of programs to translate languages has produced poor results because of the complex and subtle structure of human languages and the scale of the problem. But systems have been developed to be trained on a large (possibly hundreds of millions) number of examples of language usage. The trained models are then applied to an input in one language and provide output which is very likely to be a satisfactory translation in another language of that input.

Machine learning systems are very different from computers running programs written to model problems to be solved. While the implementation of a machine learning system may be made by means of a computer program, this is not the only way to implement machine learning models. An array of analog devices (usually called gates) can implement the model in a massively parallel way. Rather than containing a program, a machine learning system constructs a model which transforms an input through a huge number of gates to produce an output which has a statistical meaning. The operation of the gates is modified in the training steps until the behavior of the model converges on a tendency to produce desired results.

Machine Learning System Models

A machine learning system model or just "model" as used in this specification and in the claims is a large set of parameters represented as data or physically and arranged in such a way that they can be adjusted by a training process based on a collection of data that represents the system being modeled. The model also allows inputs that represent a particular state or set of states of the system to be analyzed by use of the model. The use of the model transforms the inputs into a set of outputs that constitute an analysis of the states being analyzed.

A model can be applied to a set inputs by means of an algorithm executed by a processor or by means of a physical analog device to perform the transformation. The algorithm or device is only the means of evaluation and is distinct from the model which is the set of trained parameters and the structure in which they interact.

Training a Model

In this specification and in the claims the process of training a model consists of applying data representing possible inputs to the machine learning system with the model in its current state of possibly partial training. The outputs of the system are used to generate incremental adjustments to improve the transformation of the inputs into outputs better representing the desired behavior of the system.

The usual way to determine the adjustment to be made to the model for each group of inputs presented is to calculate or measure the effect on the outputs of each parameter in application of that set of inputs. If the effect is favorable in providing outputs that correspond as wanted to the inputs then the parameter is very slightly augmented to improve the overall behavior of the model as trained.

There are many ways to accumulate the data sets used for training. One way is to find or set up a large number of examples with known outcomes and collect the data from them. Another way is to write an algorithm which generates examples. The examples can be graded by people or the generation method may be able to predict the outcomes. Some problems are easy to solve in reverse; i.e. a set of inputs may be easier to get from a assumed output than to find the output from a set of inputs. For example, to train a system to distinguish pictures of dogs from pictures of cats one can get pictures from public sources such as the internet and use humans to label the species depicted. That set can be used to train a model which can test other pictures.

Convergence

The training process is continued for each item in the training set data. Because it is important that training result in a stable and gradual progression of the model toward the desired behavior teach round which uses the set of training data items only changes the model by a small increment. The rounds are repeated many times and the results are compared to data reserved for testing in order to measure the effectiveness of training. If the structure of the model is well chosen than parameters will converge on values that produce the desired outputs for various input sets.

Training in Levels

Models can be arranged in levels both for training and for evaluation of inputs. The application of the model to a set of inputs generates outputs that describe in a higher level of generality the meaning of the inputs. Those outputs can become inputs to further structure which is a model for a more general transformation of the original inputs toward meaningful outputs.

In this specification and in the claims, a level of training is the training of a portion of the parameters of a model to produce outputs that are trained until a state of convergence is attained and made available for input the next portion of the model. That is, distinct levels are made distinct by separate training to convergence. It is possible to simultaneously train multiple levels, but they are distinct levels when they are separately tested for convergence. A level that is not tested for convergence but which uses inputs from a level that has been brought to convergence is a distinct level from the level providing the inputs.

Typical models are in at least four levels. The first which here is called the Basic level takes raw sensor input and describes it in terms directly definable based on the input data. Examples would be detection of edges from visual data and of tones, harmonics and burst timings for audible data. The second level which is here called the General level is to identify objects and events from the output of the first level. Examples would be to detect a person crossing the path of the sensor or identifying a sound as a gunshot or crowd noise. The third level, herein called the Specific level is to allow the model to identify actions and objects appropriate to the purpose of use of the model. Examples of this level include model layers to implement steering or acceleration of a vehicle or determination of compliance with a standard in a specific type of situation. There is also a fourth level called the In-Use level in many implementations. This level incorporates data collected while a model is in use which modifies the model to allow evaluations at a later time to take into account earlier inputs or evaluations where a series of evaluations is made.

Implementation of Training on a Processor with a Memory

Training requires a very large amount of processing to apply the large amount of data in the training set repeatedly to incrementally cause the model to converge on the desired behavior. If the adjustments from one pass through the data are too large, then the model may not converge or may not allow the effects of all of the inputs to diffuse through the model structure and correctly operate. For this reason, specialized very powerful processors are used for training. They are not appropriate for incorporation in portable devices because of considerations of size and expense.

Basic Training

In this specification and in the claims, basic training refers to training which is used to interpret inputs from sensors or raw data from data sources to identify aspects of objects and actions treated as objects that are implied by the data and too general in nature to identify the potentially detected objects at this stage. Examples include edge detection, categorization of sounds by location of the source, face detection, orientation in space, counting objects, elimination of backgrounds and many other general tasks of interpretation.

A portion of a machine learning model with this training can be used for many applications and could be supplied by a specialized developer. It's training would be brought to convergence and the outputs supplied to the next level of training when the model is used to evaluate inputs either for further training of other levels or in actual use.

Data for General Training Describing the Area of Application of a Model

Data for the general level of training can be acquired by collecting a number of real examples or by generating examples with a program to produce examples and training data. In this and in other levels, it is often much easier to produce a program for generating examples for machine learning than to determine specific rules to allow determinative non-learning algorithms for evaluating rules designed for human understanding.

Data for Training Concerning Compliance with a Standard

There is often available a set of examples to be made into training data from prior application of a rule set. For example, a dress code model could be made by using video collected over a period of time of people entering a venue. The videos could be graded by whether persons are admitted or turned away by entry personnel. This would allow automatic generation of a training set by processing the videos.

Transferring a Trained Model

Levels of training of a machine learning model can be divided into two classes. The first class is those levels that require very large amounts of processing power and time to train. These typically use large training sets and are done before other levels. They include in most cases the basic training levels which are concerned into extracting interesting features from raw data usually from sensors and the general training levels which concern coordination of features in sets of circumstances which are designed to encompass the specific situation to be evaluated. These levels cannot be conveniently handled in real time and on a processor convenient to take into the field to perform evaluations.

The second class of levels are those that must be performed after the specific situation to be evaluated is determined. They must be performed in real time and on processors available at that time. The model trained by the first class of levels can be transferred to a more convenient processor for the second class of levels of training.

Data for Testing in Particular Applications

After a model is trained in several levels and downloaded to a processor to use the model to evaluate situations, data must be collected with an appropriate sensor. The data is provided to the processor as input to the model for an evaluation to produce outputs. The outputs may have further non-machine learning processing to produce a determination from the model in use.

Acquisition of Testing Data with a Sensor

A portion of the data collected or generated at each level is reserved for testing. This data is not used for training to enable testing the model without concern that the model might be effect only with the specific cases used for training.

A Trained Model as a Special Purpose Machine

Once a model is trained and put into an environment that allows it to evaluate sets of input data the combination becomes a special purpose machine for making the determinations for which the model was trained. The feedback that is used to adjust parameters to produce desired outputs from inputs has created a network that can operate on other inputs to produce similar results. This behavior has been tested and the machine can be put into use.

Figures Concerning Machine Learning

FIG. 25

FIG. 25 is a diagram of the structure of a simple recurrent neural net. A neural net based on these principles is a preferred way to implement a machine learning model.

The layers of the model are sequenced as in the arrow 600. In the depicted embodiment there are 4 layers. Sensors 601 detect data to be analyzed an provide signals to a preprocessing unit 602 which applies analog and digital methods to simplify and quantify them for input for evaluation by the machine learning system. Outputs 603 of the preprocessing are supplied as inputs to the first layer 604 of the model. The first layer is implemented in two sublayers 605 which are completely interconnected 606. Typical neural network models have multiple sublayers in each layer and often have complete interconnections. Each interconnection contains a parameter which determines the strength of the interconnection. Each layer and sublayer consists of a number of data structures called neurons Training adjusts the parameters in small increments to cause the model to converge on the desired behavior. A level of training works on a layer or group of layers to produce convergence to the desired behavior for that level. Connections between major layer structures 607 are often much more sparse and are designed to transferred information which is correlated to patterns detected by the earlier layer. This layer is trained to do a very low level of pattern analysis producing patterns identifying groups of related data and statistical representations of data. In a vision type of system this might be a way to identify the edge of an object.

The second layer of the model 608 has a single sublayer. This layer has recursive connections 609 between outputs of neurons of the model which allows the model to represent time sequences. In practice this layer would have other sublayers with much more complete connections between the neurons of the layer. These sublayers are omitted to simplify the figure. This layer could be trained to work on the output of the first layer to identify time structures of data.

The fourth depicted layer 611 is shown as being trained in an in-use training level. Data from a sensor is processed by a training program to allow more effective machine learning methods to be applied at that late stage by a training module 612 on the evaluating processor. Because of the limited time an processing power available for real time training this is limited in scope but because of the extensive analysis already done on the data by earlier layers of the model, a very simple layer with simple training can make a major contribution to the results.

The outputs of the last layer are available then for non machine learning processing, counting and use or display 613.

FIG. 26

FIG. 26 is a diagram of the process for developing the pattern matching software for a neural net such as in FIG. 25 is shown. The software to be developed is a recurrent neural net with an input layer, a recurrent layer, a additional fully connected hidden layer and an output layer. Other more complex structures are also easily implemented but this structure would be sufficient for the low level of accuracy needed in many embodiments.

The first step of the development is to accumulate 620 a data set for training and testing. Several data sets are required as described for FIG. 25. One set of data is collected by a devices that sense details in quantity that might need to be used to develop the ability to analyze sparser data in final use. The processor is programmed to collect data from the sensors and transmit it via the communication module to an outside data collection system. A substantial number of real or constructed virtual objects are used for training and the resulting data is graded and categorized by manual or computer analysis and entered into the database.

The data is divided into two sets with a larger portion for training and a smaller portion for accuracy testing. This is considered labeled data because it contains both input (sensor) data and the desired output for that data (presence or absence of transfer to the next layer).

In this and related embodiments, a step in the development which might be started in parallel with data collection is the design of an appropriate neural network. The sizing of the layers and the setting of various factors in the neural net which are in addition to the factors and values (parameters) that are adjusted in training are collectively referred to as hyperparameters to distinguish them from the "parameters" which are adjusted in training the neural network. The hyperparameters are initialized 621 to appropriate values. In some systems that are taught hyperparameters are adjusted during the course of training but are distinct from trainable parameters because the adjustments are on the basis of the progress of the training rather than being direct functions of the data.

The next step is to initialize 622 the parameters which are to be trained. Appropriate initialization is necessary for reasonably rapid convergence of the neural net. A number of techniques are taught to product an initial set of values which produced good training progress.

The network is then trained 623 by passing data set items through the network as implemented on a training processor. Because training requires larger processing power and time than use of the network after training special powerful processors are used for this step. The training process adjusts the parameters incrementally on the basis of the output of the neural network. The hyperparameters specify the methods of calculating the adjustment to parameters. Generally, the output of the network is used to back propagate through the network to provide further input to the adjustments. The items in the training portion of the dataset are used repeatedly while the convergence of the network is observed 624 by processes in the training data processor.

If the convergence is judged 625 not to be adequate the training is stopped, the hyperparameters are adjusted 206, the neural network is reinitialized and the training process is repeated until satisfactory convergence is obtained. The smaller portion of the data set which has been retained and not used for training is then passed 627 through the neural network (classified) and the output is checked 628 for accuracy. If accuracy is not sufficient for the goals of the particular system being developed then the net structure is made larger 629 and the training process is repeated until satisfactory accuracy is obtained.

The trained neural network is then downloaded 630 to the target device, which is then ready for system testing 631.

FIG. 27

FIG. 27 shows the steps and structure of the basic information flow of a device and its training. There is a timeline 640 which is divided into three periods. First pre-download 641 which is the time prior to download of the pre-trained machine learning model to a device for its use. The model is pre-trained during this time. The next time period is pre-use 642, the time for training from sensors associated with the device for use. which is used to train the escape device and store relevant conclusions. The final time period is the use period 643. During this time collection of data and training continue but evaluation of the model and development of escape plans and instructions also occurs. The instructions are put to the output display transducers to allow the protected person to escape the venue.

During the pre-download period, the machine learning model is constructed and initialized to parameter values suitable to allow effective training 644. Pre-training 646 typically proceeds in two stages and uses two data sets. The first stage uses a generic data set and trains for general skills such as recognizing objects and other entities such as edges from a camera sensor. The data set for this stage may not be one specifically developed for this application but is suitable to the sensors and processing resources to be used in the device. The second stage used a data set developed 645 specifically for this application which is based on real or virtual sensor data and use area analysis scenarios. Such data sets would find data concerning specific layouts and situations and data concerning typical area that can predict possible situations in actual areas to be especially relevant. The data sets are trained 646, usually sequentially, into the model. Low level training. such as here used, is computation intensive; but it can be accomplished on a one-time basis using substantial computing resources not needed by the final surveillance device. If the device is produced in mass quantities the pretraining results are loaded into each device in the process of production. Additional data sets and training can be done prior to use of the device to adapt it to specific anticipated uses or locations.

During the pre-use period, the surveillance device or at least its sensors are in a use area. Sensors of the device collect 647 information about the area and objects or events in the area. Information is also downloaded 648 from various servers and beacons provided for this use or by outside sources. The sensor and server information is used to do more specific training of the model. This can be accomplished by a processor in the device; but it may also be assisted by training resources located in servers away from the escape device. Sensor and server data can also be stored 650 to be used as an input in the later use stage. The surveillance device is then readied to begin use.

During the in-use period, the device is actively surveilling in a course granularity mode. The model may continue to be trained 651 from all information sources including stored data 652 and data that continues to be collected from sensors 653 and servers 654. The model is evaluated 655 based on its current training 252, stored data 652, continuing sensor data 653 and continuing server data 654. When the evaluation of the model 655 indicates the need the system transitions to the high resource use fine granularity mode 656

FIG. 28

FIG. 28 shows the training and operation steps of the model used to represent data to be evaluated and the situation for evaluation. This diagram is intended to show the relationships between different levels of training of a model each of which builds on the levels below. The flow of the training and application of the model are shown by the arrow 660. The main diagram of the figure shows the detailed steps. The description is for a general neural net type of model. Other model types can follow the same general flow and neural nets can incorporate implementation details not shown. The model generally has layers which are arranged in the same order as the training steps and when a particular level of the model is being trained, data is evaluated by the earlier levels of the model which have already had training to provide inputs to the level being trained.

The model is initialized 661 with suitable values in a trainable parameter set. A basic data set 662 with basic information is used to perform the first level of training 663 the model. The model would generally have multiple layers and the basic data set would be used to train the earliest layers of the model. It would use data to allow these layers to recognize or react to features such as edges in pictorial data and sound impulses for audio data. This training would be applicable to many applications of a machine learning system. It may be provided by a supplier of implementation and hardware systems and these layers may be acquired in an already trained condition by implementations of applications.

The second level of training 664 in the depicted embodiment is done with a second "General" data set 665. This data is selected to allow the model to use inputs to recognize objects and entities relevant to the application of the model. The general data set in the depicted embodiment is generated by a combination of data generation from a simulation 666 of general applications of the model and specific data gathered 667 for such applications. The applications at this level include recognition of objects such as persons, articles of clothing, signs and other items used to define and the movements made by sensors as they traverse a scene. Prior to the training at this level layers are typically added 668 to the model to allow the training to take effect in facilitating analysis with the aid of the moved based on inputs processed by preceding levels of trained model.

The third level of training 669 in the depicted embodiment is done with a second "Specific" data set 670. This data is selected to allow the model to use inputs to recognize objects and entities relevant in a context relevant to a particular application of the model. The general data set in the depicted embodiment is generated by a combination of data generation from a simulation of specific applications of the model and specific data gathered for such applications. Typical information used to generate a simulation at this level include many variations of relevant objects for the purpose of applying standards similar to the one to be implemented. Prior to the training at this level layers are typically added 653 to the model to allow the training to take effect in facilitating analysis with the aid of the model based on inputs processed by preceding levels of trained model After the model is trained through several levels, it is usually downloaded 674 from high powered training processors which are only used to prepare the model to a smaller portable processor to execute the model in actual use. To use the model to evaluate a situation data is gathered from the situation 675 by means of appropriate sensors and prepared to serve as an input 676 for the model. The model on the basis of (evaluating) the inputs generates 677 outputs 678 corresponding to the action of the training on the parameters of the model.

In some more advanced implementations of the system, inputs and outputs are used to select 679 additional training for the model. The information in the inputs and outputs can cause the download of sets of parameters which can be added to the model or a limited training process similar to that used to develop the original model can be accomplished by the evaluation processor.

I claim:

1. A method of making a determination using machine learning model comprising:
   (a) operating a machine learning system implemented on a first processor with a machine learning model, wherein:
   the machine learning model has been trained in a first step on a second processor with a first set of data concerning at least one of identification of objects, identification of persons, and a person's movements of body parts,
   the machine learning model has been transferred to at least one of the first processor and a third processor subsequent to the first step of training,
   the machine learning model has been trained in a second step subsequent to the transfer with a second set of data gathered subsequent to the transfer by a sensor concerning at least one of an object, a person, and of movements of body parts of a person (b) submitting a third set of data concerning at least one of an object, a person, and movements of body parts of a person gathered subsequent to the second step of training by a sensor to the first processor to be used as input to the machine learning model; the third set of data is gathered at a coarse level of granularity with a lower sampling density and the determination is of the need to gather a fourth set of data at a finer level of granularity with a higher sampling density, and (c) the first processor has a memory containing a program to use the machine learning model to produce a determination of at least one of compliance with a physical standard, identification of a specific person, and identification of a specific object.

2. The method of claim 1 wherein:
the determination is of at least one of the existence of a person driving a vehicle and the existence of a person walking.

3. The method of claim 1 wherein:
the determination is of the existence of a threat.

4. The method of claim 1 wherein:
(a) the first processor does not have sufficient processing power to perform the second training of the machine learning model;
(b) the machine learning model is transferred from the second processor to the third processor subsequent to the first step of training;
(c) the machine learning model is trained in the second step of training with the third processor subsequent to the transfer from the second processor to the third processor;
(d) the machine learning model is transferred from the third processor to the first processor subsequent to the second step of training;
(e) the determination is made with the first processor, the machine learning model and the third set of data subsequent to the transfer from the third processor to the first processor; and
(f) a processor with greater processing power than the first processor is activated on the basis of the determination.

5. A device for making a determination using a machine learning model comprising:
a first processor with the machine learning model wherein:
(a) the machine learning model has been trained in a first step on a second processor with a first set of data concerning at least one of identification of objects, identification of persons, and a person's movements of body parts, the machine learning model has been transferred to at least one of the first processor and a third processor subsequent to the first step of training, the machine learning model has been trained in a second step subsequent to the transfer with a second set of data gathered subsequent to the transfer by a sensor concerning at least one of an object, a person, and of movements of body parts of a person;

(b) when a third set of data concerning at least one of an object, a person, and movements of body parts of a person gathered subsequent to the second step of training by a sensor is presented the first processor to be used as input to the machine learning model, Where in the third set of data is gathered at a coarse level of granularity with a lower sampling density and the determination is of the need to gather a fourth set of data at a finer level of granularity with a higher sampling density, and (c) the rust processor has a memory containing a program to use the machine learning model to produce a determination of at least one of compliance with a physical standard, identification of a specific person, and identification of a specific object.

6. The device of claim 5 wherein: the determination is of at least one of the existence of a person driving a vehicle and the existence of a person walking.

7. The device of claim 5 wherein: the determination is of the existence of a threat.

8. The device of claim 5 wherein: (a) the first processor does not have sufficient processing power to perform the second training of the machine learning model;
(b) the machine learning model is transferred from the second processor to the third processor subsequent to the first step of training;
(c) the machine learning model is trained in the second step of training with the third processor subsequent to the transfer from the second processor to the third processor:
(d) the machine learning model is transferred from the third processor to the first processor subsequent to the second step of training;
(e) the determination is made with the first processor, the machine learning model and the third set of data subsequent to the transfer from the third processor to the first processor; and
(f) a processor with greater processing power than the first processor is activated on the basis of the determination.

* * * * *